(12) United States Patent
Fujii

(10) Patent No.: US 12,164,177 B2
(45) Date of Patent: Dec. 10, 2024

(54) IMAGING APPARATUS AND DEFOCUS AMOUNT CALCULATION METHOD

(71) Applicant: Sony Group Corporation, Tokyo (JP)

(72) Inventor: Shinichi Fujii, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/791,640

(22) PCT Filed: Dec. 7, 2020

(86) PCT No.: PCT/JP2020/045471
§ 371 (c)(1),
(2) Date: Jul. 8, 2022

(87) PCT Pub. No.: WO2021/145095
PCT Pub. Date: Jul. 22, 2021

(65) Prior Publication Data
US 2023/0040322 A1    Feb. 9, 2023

(30) Foreign Application Priority Data

Jan. 16, 2020   (JP) ................. 2020-005453

(51) Int. Cl.
*G02B 7/34*     (2021.01)
*G02B 7/36*     (2021.01)
(Continued)

(52) U.S. Cl.
CPC ............... *G02B 7/34* (2013.01); *G02B 7/36* (2013.01); *G03B 13/36* (2013.01); *H04N 23/60* (2023.01); *H04N 25/70* (2023.01)

(58) Field of Classification Search
CPC . G02B 7/34; G02B 7/36; G02B 7/346; G03B 13/36; G03B 13/00; H04N 23/00;
(Continued)

(56) References Cited

U.S. PATENT DOCUMENTS

| | | | |
|---|---|---|---|
| 5,596,387 A * | 1/1997 | Takagi | G03B 17/18 396/234 |
| 2014/0001589 A1* | 1/2014 | Fukuda | H04N 25/704 257/432 |

(Continued)

FOREIGN PATENT DOCUMENTS

| | | |
|---|---|---|
| JP | 2014-228818 A | 12/2014 |
| WO | 2017212909 A1 | 12/2017 |

(Continued)

OTHER PUBLICATIONS

WO 2019/102887 (Year: 2019).*
International Search Report (PCT/ISA/210), International Application No. PCT/JP2020/045471, dated Feb. 22, 2021.

*Primary Examiner* — Jennifer D Bennett
*Assistant Examiner* — Erin R Garber
(74) *Attorney, Agent, or Firm* — Michael Best & Friedrich LLP

(57) ABSTRACT

An imaging apparatus according to the present technology includes an imaging element including a light shielding pixel and a photodiode division pixel, and a defocus amount calculation unit that calculates a defocus amount using at least one of an output signal of the light shielding pixel and an output signal of the photodiode division pixel on the basis of an exposure amount.

23 Claims, 32 Drawing Sheets

(51) Int. Cl.
*G03B 13/36* (2021.01)
*H04N 23/60* (2023.01)
*H04N 25/70* (2023.01)

(58) Field of Classification Search
CPC ...... H04N 23/60; H04N 25/70; H04N 25/704; H04N 23/672; H04N 25/75
See application file for complete search history.

(56) References Cited

U.S. PATENT DOCUMENTS

2019/0068869 A1* 2/2019 Kadambala ............ G03B 13/36
2020/0358989 A1* 11/2020 Hoshino ................ H04N 25/42
2021/0274110 A1* 9/2021 Sambonsugi ........ H04N 23/672

FOREIGN PATENT DOCUMENTS

WO   2019031000 A1  2/2019
WO   WO-2019102887 A1 * 5/2019 ....... H01L 27/14607

* cited by examiner

FIG. 21

|  | LIGHT SHIELDING PIXEL | PD DIVISION PIXEL |
| --- | --- | --- |
| PURPOSE | PHASE DIFFERENCE DETECTION ONLY | SHARED NORMAL OUTPUT/ PHASE DIFFERENCE DETECTION |
| NUMBER OF PLACEMENTS | FEW (DISCRETE ARRANGEMENT) | MANY |
| LOW ILLUMINANCE PERFORMANCE | LOW | HIGH |
| PUPIL CORRECTION DESIGN FLEXIBILITY | YES | NONE |
| OFF-AXIS PERFORMANCE | HIGH | LOW | ns
IMAGING APPARATUS AND DEFOCUS AMOUNT CALCULATION METHOD

TECHNICAL FIELD

The present technology relates to an imaging apparatus including an imaging element having a pixel group that outputs a phase difference signal, and a defocus amount calculation method.

BACKGROUND ART

Some imaging apparatuses have a function of acquiring focus information on a subject in order to perform autofocus control. Among the apparatuses, there is an apparatus provided with pixels for detecting a focus. For example, Patent Document 1 discloses a configuration in which a pixel of a photodiode (PD) division method (a photodiode division pixel) and a pixel of a light shielding pixel method (a light shielding pixel) are provided as pixels for detecting a focus.

CITATION LIST

Patent Document

Patent Document 1: WO2017/212909

SUMMARY OF THE INVENTION

Problems to be Solved by the Invention

In these pixels for detecting a focal point, a signal for detecting a phase difference is output. However, there is a problem that the S/N ratio of the phase difference signal deteriorates in a dark environment where the amount of light tends to be insufficient.

Therefore, an object of the present technology is to acquire a defocus amount for a subject with higher accuracy even in a dark environment where the amount of light tends to be insufficient.

Solutions to Problems

An imaging apparatus according to the present technology includes an imaging element including a light shielding pixel and a photodiode division pixel, and a defocus amount calculation unit that calculates a defocus amount using at least one of an output signal of the light shielding pixel and an output signal of the photodiode division pixel on the basis of an exposure amount.

Therefore, the defocus amount can be calculated by suitably selecting one of the output signal of the light shielding pixel and the output signal of the photodiode division pixel in the imaging apparatus.

In the imaging apparatus described above, the light shielding pixel may have a pupil division function by including a light shielding portion that shields one of a pair of light fluxes having passed through a pair of partial regions deviated in opposite directions in a predetermined direction in an exit pupil and a light receiving element that receives the other light flux.

Therefore, the light shielding pixels are, for example, either a pixel on which only the light that has passed through the left region that is the left-half region of the exit pupil due to the light shielding portion is incident or a pixel on which only the light that has passed through the right region that is the right-half region of the exit pupil due to the light shielding portion is incident.

In the imaging apparatus described above, the photodiode division pixel may have a pupil division function by including a division pixel that receives each of a pair of light fluxes having passed through the pair of partial regions.

Therefore, the division pixels included in the photodiode division pixels are division pixels on which only the light that has passed through the left region that is the left-half region of the exit pupil is incident and division pixels on which only the light that has passed through the right region that is the right-half region of the exit pupil by the light shielding portion is incident.

In the imaging apparatus described above, each pixel included in the imaging element may be one of the light shielding pixel and the photodiode division pixel.

That is, in the imaging element, all pixels are either light shielding pixels or photodiode division pixels.

The defocus amount calculation unit in the imaging apparatus described above may calculate the defocus amount using an output signal of the light shielding pixel in a case where the exposure amount is equal to or greater than a threshold value.

Since the light shielding pixel includes the light shielding portion, the output signal level is smaller than that of the PD division pixel.

In a case where the exposure amount is less than a threshold value, the defocus amount calculation unit in the imaging apparatus described above may calculate the defocus amount by using at least one of an output signal of the light shielding pixel and an output signal of the photodiode division pixel according to an on-axis region that is a region including a central portion of the imaging element or an off-axis region that is a region other than the on-axis region of the imaging element.

Therefore, the focus control is performed even when the exposure amount is less than the threshold value.

The defocus amount calculation unit in the imaging apparatus described above may calculate the defocus amount using an output signal of the photodiode division pixel in the on-axis region.

Since the photodiode division pixel does not include the light shielding portion, the output signal level is higher than that of the light shielding pixel.

The defocus amount calculation unit in the imaging apparatus described above may calculate the defocus amount using an output signal of the light shielding pixel in the off-axis region.

Therefore, a defocus amount with high reliability is calculated.

The defocus amount calculation unit in the imaging apparatus described above may calculate the defocus amount using an output signal of the photodiode division pixel in the off-axis region.

Therefore, a defocus amount with high reliability is calculated.

The defocus amount calculation unit in the imaging apparatus described above may calculate the defocus amount using an output signal with higher reliability among an output signal of the light shielding pixel and an output signal of the photodiode division pixel.

Therefore, a defocus amount with high reliability is calculated.

In a case where the exposure amount is less than a threshold value, the defocus amount calculation unit in the imaging apparatus described above may perform autofocus control on the basis of a contrast method in an off-axis region that is a region other than an on-axis region that is a region including a central portion of the imaging element.

In the off-axis region in a case where the exposure amount is insufficient, the accuracy of the phase difference information based on the output signal of the light shielding pixel and the output signal of the photodiode division pixel may be low.

The imaging element in the imaging apparatus described above may include a plurality of types of the light shielding pixels according to a pupil distance of the exit pupil.

Therefore, even if the pupil position of the exit pupil changes as the imaging optical system is driven, an appropriate phase difference signal can be obtained from any of the plurality of types of light shielding pixels.

The plurality of types of light shielding pixels in the imaging apparatus described above may have different light shielding regions of the light shielding portion.

For example, the light shielding region may become larger as the pupil distance becomes shorter.

The defocus amount calculation unit in the imaging apparatus described above may calculate the defocus amount using an output signal of the light shielding pixel selected according to the pupil distance of the exit pupil.

Therefore, the light shielding pixel that receives the light passing through the one-side region of the exit pupil is selected.

In the imaging apparatus described above, a camera control unit that acquires the pupil distance from a barrel control unit included in a lens barrel may be provided.

For example, in the imaging apparatus including an interchangeable lens barrel, the light shielding pixel corresponding to the pupil distance is selected.

In the imaging apparatus described above, the light shielding pixels disposed in the same row on the imaging element may correspond to the same pupil distance.

Therefore, the output signals of the plurality of types of light shielding pixels are not mixed with the pixel signal read for each pixel row.

In the imaging apparatus described above, a camera control unit that performs a driving instruction of a focus lens included in an imaging optical system on the basis of the defocus amount may be provided.

Therefore, the focus lens is controlled by the phase difference signal based on the exposure amount.

In the imaging apparatus described above, a user interface control unit that performs display control based on the defocus amount may be provided.

Therefore, for example, information for notifying the photographer of the focus state according to the current lens position can be provided.

In the imaging apparatus described above, in a case where the defocus amount is calculated using the output signals of the light shielding pixels, the imaging element may add and output the output signals of the photodiode division pixels.

Therefore, the number of times of reading can be reduced as compared with the case of separately reading the output from each division pixel.

In the imaging apparatus described above, in a case where the defocus amount is calculated using the output signals of the photodiode division pixels, the imaging element may output each of the output signals of the photodiode division pixels.

Therefore, the output signals of the division pixels are acquired without being added.

In the imaging apparatus described above, a signal processing unit that performs signal processing on an image signal output from the imaging element may be provided, in which the signal processing unit may add the output signals of the photodiode division pixels in a column direction in a case where the exposure amount is less than a predetermined amount.

Therefore, the output level of the signal output from the photodiode division pixel can be maintained at a predetermined level or more.

A defocus amount calculation method according to the present technology includes selecting a phase difference signal of at least one of an output signal of a light shielding pixel and an output signal of a photodiode division pixel on the basis of an exposure amount and calculating a defocus amount.

BRIEF DESCRIPTION OF DRAWINGS

FIG. 21 is a diagram illustrating a difference in performance between the light shielding pixel and the PD division pixel.

MODE FOR CARRYING OUT THE INVENTION

Hereinafter, embodiments will be described in the following order with reference to the accompanying drawings.
<1. Configuration of Imaging Apparatus>
<2. Configuration of Imaging Element>
<3. AF Control>
<4. On-axis Region and Off-axis Region>
<5. Pupil Distance and Pixel Configuration>
<6. Difference in AF Control due to Difference in Phase Difference Pixel>
<7. Selection of Phase Difference Signal>
<8. Control of Exposure Amount>
<9. Processing Flow>
<9-1. First Example>
<9-2. Second Example>
<10. Modification Example>
<11. Summary>
<12. Present Technology>

1. Configuration of Imaging Apparatus

Figure 1:
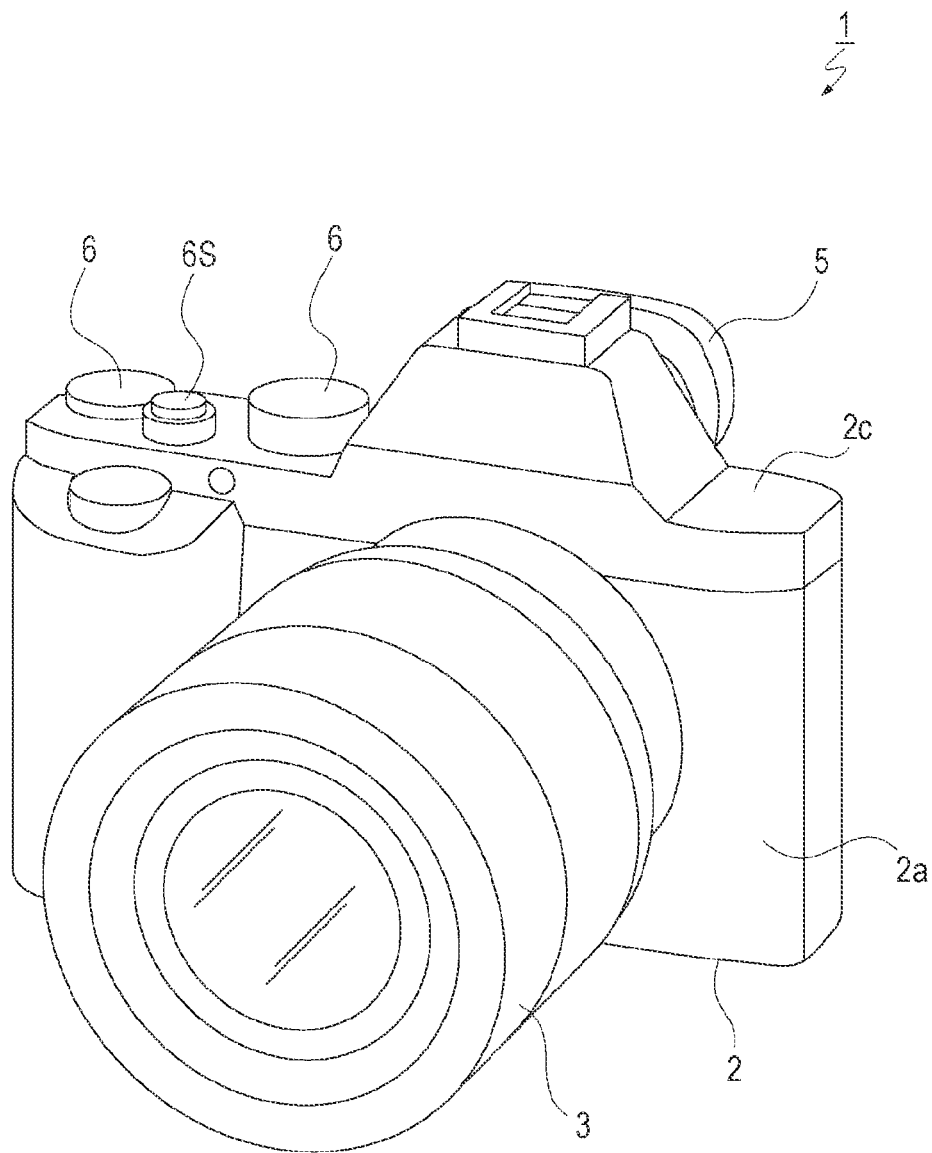
FIG. 1 is a perspective view of an imaging apparatus according to an embodiment of the present technology.

FIG. 1 illustrates an external appearance of an imaging apparatus 1 according to the present embodiment.

Note that, in each of the following examples, description will be made with the subject side as the front and the imaging person side as the rear, but these directions are for convenience of description, and the implementation of the present technology is not limited to these directions.

Figure 2:
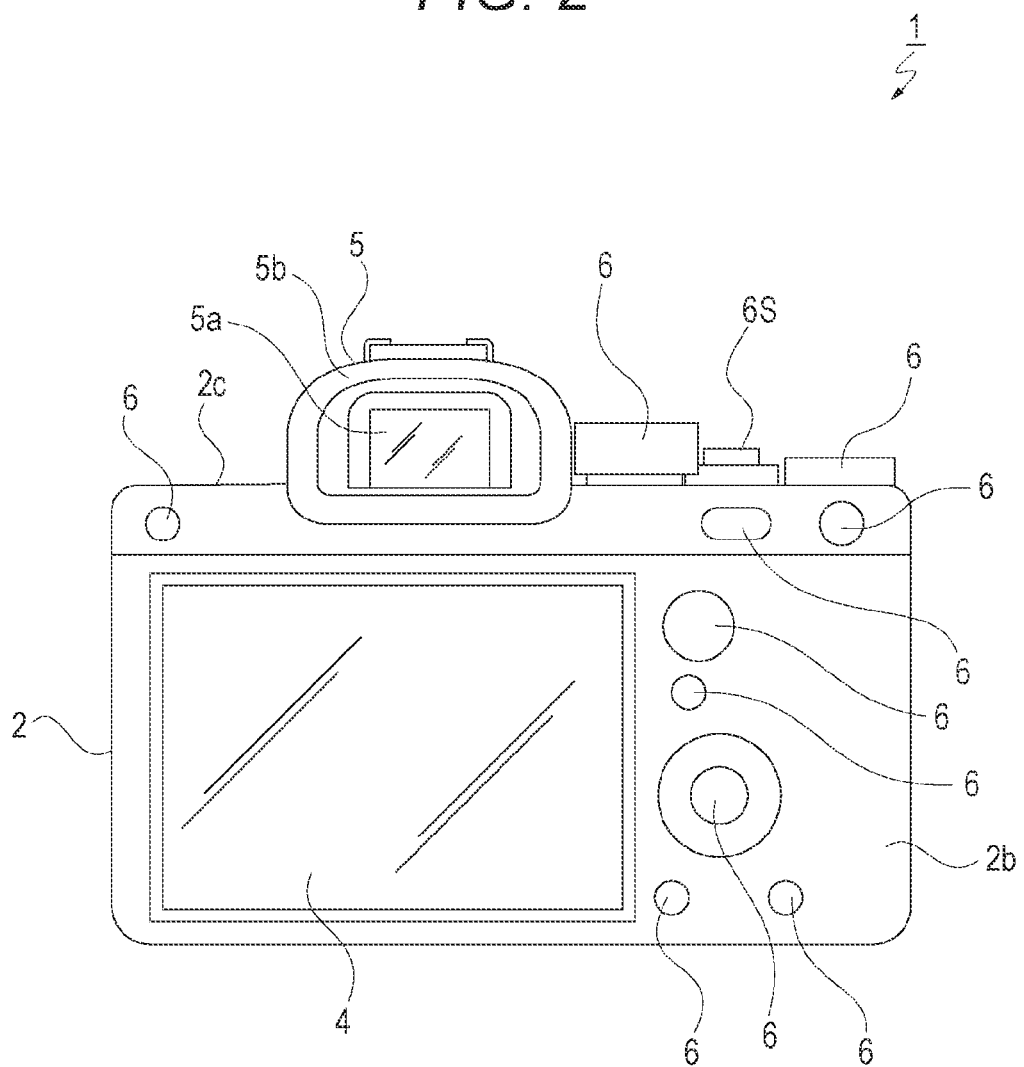
FIG. 2 is a rear view of the imaging apparatus.

As illustrated in FIGS. 1 and 2, the imaging apparatus 1 includes a camera housing 2 in which necessary units are disposed inside and outside, and a lens barrel 3 attached to a front surface portion 2a of the camera housing 2.

A rear monitor 4 is disposed on a rear surface portion 2b of the camera housing 2. A through image, a recorded image, and the like are displayed on the rear monitor 4.

The rear monitor 4 is, for example, a display device such as a liquid crystal display (LCD), an organic electro-luminescence (EL) display, and the like.

The rear monitor 4 is rotatable with respect to the camera housing 2. For example, the upper end portion of the rear monitor 4 is set as a rotation axis, and the lower end portion of the rear monitor 4 is rotatable to move backward.

Note that the right end portion or the left end portion of the rear monitor 4 may be used as a rotation shaft. Moreover, it may be rotatable around a plurality of axes.

An Electric Viewfinder (EVF) 5 is disposed on the upper surface portion 2c of the camera housing 2. The EVF 5 includes an EVF monitor 5a and a frame-shaped enclosure 5b protruding rearward to surround the EVF monitor 5a and the upper and left and right sides of the EVF monitor 5a.

The EVF monitor 5a is formed by using an LCD, an organic EL display, and the like. Note that an optical viewfinder (OVF) may be provided instead of the EVF monitor 5a.

Various operators 6 are provided on the rear surface portion 2b and the upper surface portion 2c. Examples of operator 6 include a playback menu activation button, an enter button, a cross key, a cancel button, a zoom key, a slide key, a shutter button 6S (release button), and the like.

The various operators 6 include various modes such as a button, a dial, and a pressing and rotatable composite operator. With the operator 6 of various modes, for example, a menu operation, a reproduction operation, a mode selection/switching operation, a focus operation, a zoom operation, and selection/setting parameters such as a shutter speed and an F number can be performed.

Figure 3:
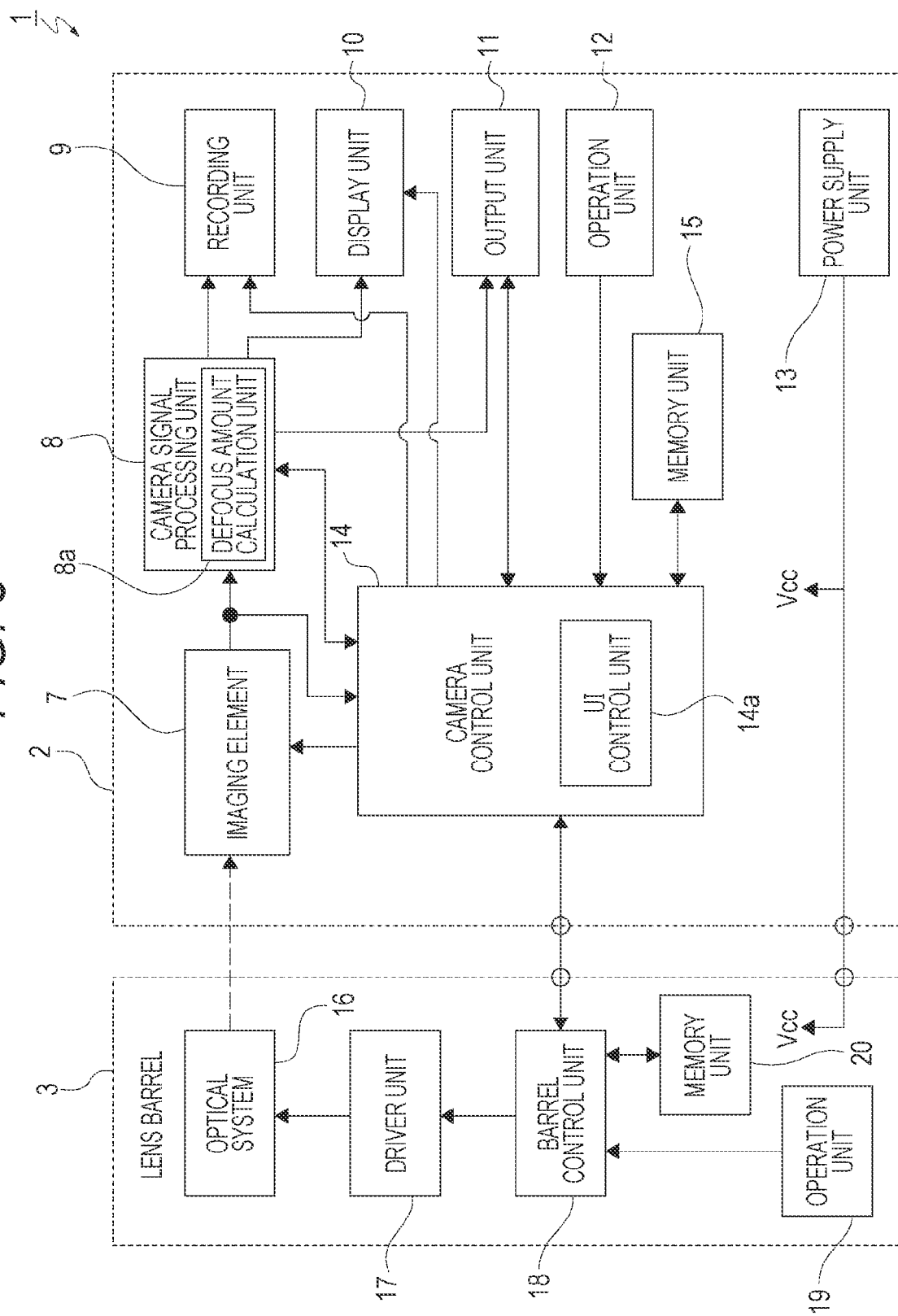
FIG. 3 is a block diagram of the imaging apparatus.

FIG. 3 is a block diagram of the imaging apparatus 1.

An imaging element 7, a camera signal processing unit 8, a recording unit 9, a display unit 10, an output unit 11, an operation unit 12, a power supply unit 13, a camera control unit 14, a memory unit 15, and the like are provided inside and outside the camera housing 2 of the imaging apparatus 1.

The lens barrel 3 includes an optical system 16, a driver unit 17, a lens barrel control unit 18, an operation unit 19, a memory unit 20, and the like.

Figure 4:
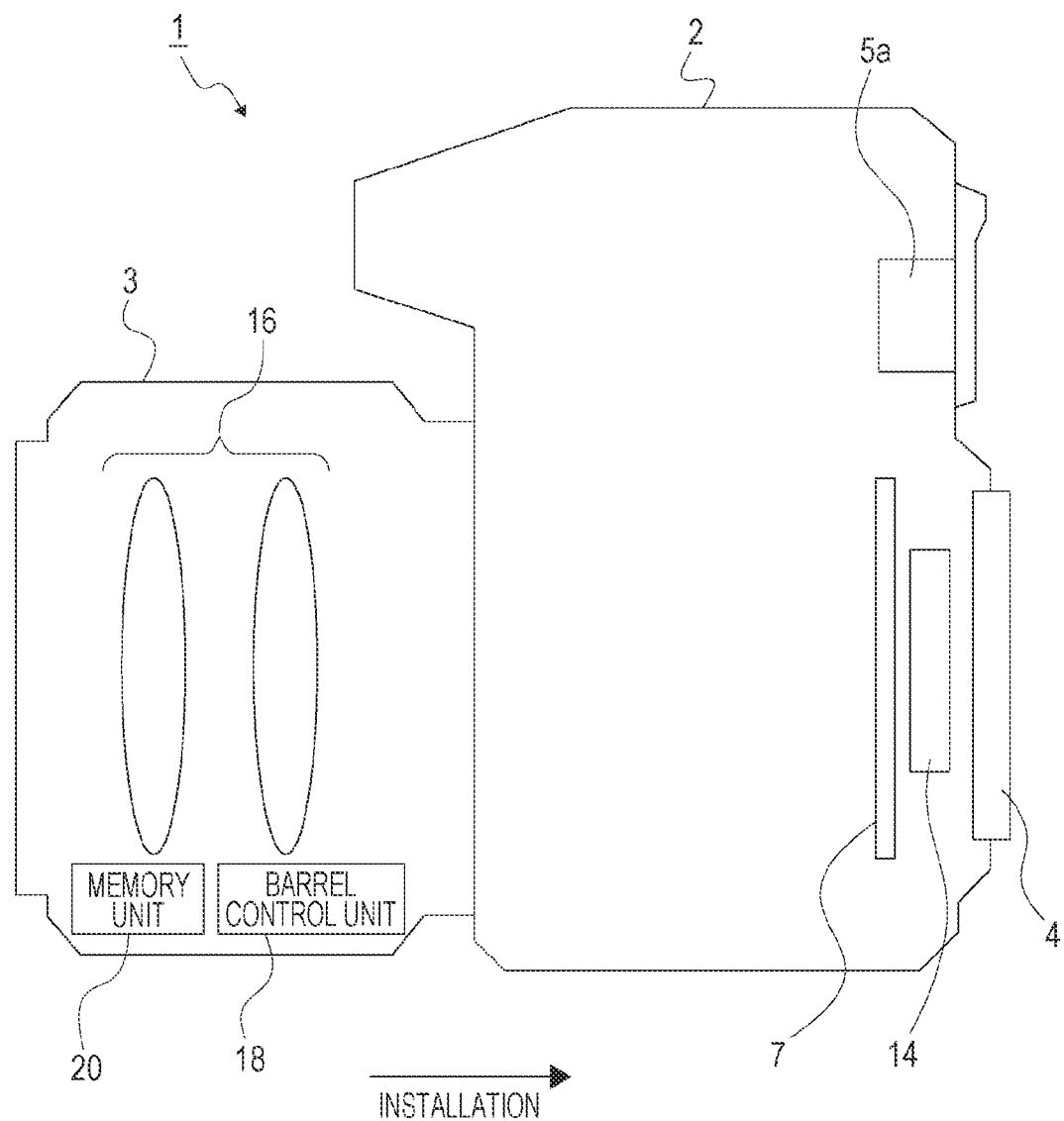
FIG. 4 is a schematic diagram of the imaging apparatus.

As illustrated in FIGS. 3 and 4, the optical system 16 includes various lenses such as an incident end lens, a zoom lens, a focus lens, and a condenser lens, an aperture mechanism that performs exposure control by adjusting, for example, an aperture amount of a lens or an iris (diaphragm) so that sensing is performed in a state where signal charge is not saturated and is within a dynamic range, and a shutter unit such as a focal plane shutter.

Note that a part of each unit configuring the optical system 16 may be provided in the camera housing 2.

The imaging element 7 is of a charge coupled device (CCD) type or a complementary metal-oxide semiconductor (CMOS) type, for example, and controls exposure of light from a subject incident through the optical system 16.

The sensor surface of the imaging element 7 includes a sensing element in which a plurality of pixels is two-dimensionally arranged. Some pixels in the imaging element 7 are pixels that output a signal for calculating the defocus amount. In the following description, a pixel that outputs a signal for calculating the defocus amount is referred to as an "image plane phase difference pixel 7a".

In the imaging element 7 in the present embodiment, all the pixels are the image plane phase difference pixels 7a for detecting the phase difference of the optical image of the subject. However, the imaging element 7 may include pixels other than the image plane phase difference pixel 7a. A detailed configuration example of the imaging element 7 will be described later.

The imaging element 7 includes a processing unit that performs, for example, correlated double sampling (CDS) processing, automatic gain control (AGC) processing, and analog/digital (A/D) conversion processing on an electric signal photoelectrically converted by a pixel. Therefore, the imaging element 7 outputs a captured image signal as digital data to the camera signal processing unit 8 and the camera control unit 14.

The image plane phase difference pixel 7a outputs a signal used to calculate the defocus amount. In the present embodiment, the imaging element 7 includes, as the image plane phase difference pixel 7a, both the light shielding pixel by a photodiode (PD) light shielding method and the PD division pixel by the PD division method. The signal output from the image plane phase difference pixel 7a is a signal obtained by photoelectric conversion, but is a signal with which phase difference information is able to be detected by subsequent processing. Therefore, in the following description, a signal output from the image plane phase difference pixel 7a and capable of detecting phase difference information may be referred to as a "phase difference signal".

The imaging element 7 outputs the phase difference signal obtained from the image plane phase difference pixel 7a to the camera signal processing unit 8 and the camera control unit 14 in the subsequent stage. The phase difference signal is used for correlation calculation for calculating the defocus amount.

The camera signal processing unit 8 includes, for example, a microprocessor specialized in digital signal processing such as a digital signal processor (DSP), a microcomputer, or the like.

The camera signal processing unit 8 includes units for performing various types of signal processing on a digital signal (captured image signal) transmitted from the imaging element 7.

Specifically, processing such as correction processing between R, G, and B color channels, white balance correction, aberration correction, shading correction, or the like is performed.

Furthermore, the camera signal processing unit 8 performs YC generation processing of generating (separating) a luminance (Y) signal and a color (C) signal from the image data of R, G, and B, processing of adjusting luminance and color, and processing such as knee correction and gamma correction.

Moreover, the camera signal processing unit 8 performs conversion into a final output format by performing resolution conversion processing, codec processing for performing encoding for recording or communication, and the like. The image data converted into the final output format is stored in the memory unit 15. Furthermore, when the image data is output to the display unit 10, an image is displayed on the rear monitor 4 or the EVF monitor 5a. Furthermore, by outputting the data from the external output terminal, the data is displayed on a device such as a monitor provided outside the imaging apparatus 1.

The camera signal processing unit 8 includes a defocus amount calculation unit 8a.

The defocus amount calculation unit 8a detects phase difference information from the output signal of the image plane phase difference pixel 7a. Specifically, phase difference information is detected from a signal group output from the plurality of image plane phase difference pixels 7a and a signal group output from another plurality of image plane phase difference pixels 7a. The camera signal processing unit 8 (or the camera control unit 14) has information about which signal group is compared in order to detect the phase difference information. This will be specifically described below.

The defocus amount calculation unit 8a calculates the defocus amount on the basis of the detected phase difference information. The calculated defocus amount may be used for an autofocus (AF) function by being used for driving a focus lens included in the optical system 16 via the lens barrel control unit 18. Furthermore, the defocus amount may be used to present information regarding the degree of focus of the subject to the user.

The recording unit 9 includes, for example, a nonvolatile memory, and functions as a storage unit that stores image files (content files) such as still image data and moving image data, attribute information of the image files, thumbnail images, and the like.

The image file is stored in a format such as joint photographic experts group (JPEG), tagged image file format (TIFF), graphics interchange format (GIF), or the like.

Various actual forms of the recording unit 9 can be considered. For example, the recording unit 9 may be configured as a flash memory built into the imaging apparatus 1, or may be configured by a memory card (for example, a portable flash memory) that can be attached to and detached from the imaging apparatus 1 and an access unit that accesses the memory card for storage and reading. In addition, as a form incorporated in the imaging apparatus 1, the recording unit may be realized as a hard disk drive (HDD) or the like.

The display unit 10 executes processing for performing various displays for the imaging person. The display unit 10 is, for example, the rear monitor 4 or the EVF monitor 5a. The display unit 10 performs processing of displaying the image data converted to an appropriate resolution input from the camera signal processing unit 8. Therefore, a so-called through image, which is a captured image during standby of the release, is displayed.

Moreover, the display unit 10 realizes display of various operation menus, icons, messages, and the like as a graphical user interface (GUI) on the screen on the basis of an instruction from the camera control unit 14.

Furthermore, the display unit 10 can display a reproduced image of the image data read from the recording medium in the recording unit 9.

Note that, in the present example, both the EVF monitor 5a and the rear monitor 4 are provided, but the embodiment of the present technology is not limited to such a configuration, and only one of the EVF monitor 5a and the rear monitor 4 may be provided, or one or both of the EVF monitor 5a and the rear monitor 4 may be configured to be detachable.

The output unit 11 performs data communication and network communication with an external device in a wired or wireless manner. For example, the captured image data (a still image file or a moving image file) is transmitted to an external display device, recording device, reproduction device, or the like.

Furthermore, the output unit 11 may function as a network communication unit. For example, communication may be performed by various networks such as the Internet, a home network, a local area network (LAN), and the like, and various data may be transmitted and received to and from a server, a terminal, or the like on the network.

The operation unit 12 provided in the camera housing 2 includes not only the above-described various operators 6 but also the rear monitor 4 adopting a touch panel system and the like, and outputs operation information corresponding to various operations such as a tap operation and a swipe operation of the imaging person to the camera control unit 14.

Note that the operation unit 12 may function as a reception unit of an external operation device such as a remote controller separate from the imaging apparatus 1.

The power supply unit 13 generates a power supply voltage (Vcc) necessary for each unit from, for example, a battery filled inside, and supplies the generated power supply voltage as an operating voltage.

In a state where the lens barrel 3 is attached to the imaging apparatus 1, the power supply voltage Vcc generated by the power supply unit 13 is also supplied to a circuit in the lens barrel 3.

Note that the power supply unit 13 may be formed with a circuit that charges a battery or a circuit that generates a power supply voltage Vcc using a DC voltage converted and input by an AC adapter connected to a commercial AC power supply as a power supply.

The camera control unit 14 includes a microcomputer (an arithmetic processing device) including a central processing unit (CPU), and performs overall control of the imaging apparatus 1. For example, control of the shutter speed according to the operation of the imaging person, an instruction on various types of signal processing in the camera signal processing unit 8, imaging operation and recording operation according to the operation of the user, and reproduction operation of the recorded image file are performed.

The camera control unit 14 switches various imaging modes and the like. Examples of the various imaging modes include a still image imaging mode, a video imaging mode, a continuous imaging mode for continuously acquiring still images, and the like.

The camera control unit 14 includes a user interface control unit (UI control unit) 14a for enabling the user to operate these functions. The UI control unit 14a performs processing of detecting an operation on each operator 6 provided in the imaging apparatus 1, display processing on the rear monitor 4, operation detection processing, and the like.

The UI control unit 14a performs display control for notifying the user of the defocus amount. By recognizing the notification about the defocus amount, the user can manually perform a focusing operation or set an arbitrary defocus state. The notification is performed by the display unit 10, for example. Specifically, an icon image may be displayed, or characters or the like may be displayed.

Furthermore, the camera control unit 14 issues an instruction to the lens barrel control unit 18 in order to control various lenses included in the optical system 16.

For example, processing of designating an aperture value in order to secure a light amount necessary for AF control, an operation instruction of an aperture mechanism according to the aperture value, and the like are performed.

The camera control unit 14 can acquire information on various lenses included in the optical system 16 via the lens barrel control unit 18. The information of the lens includes, for example, information of a model number of the lens, a position of the zoom lens, information of an F value, information of an exit pupil position, or the like. Furthermore, the camera control unit 14 can acquire an aperture value of an aperture mechanism included in the optical system 16.

The memory unit 15 stores information and the like used for processing executed by the camera control unit 14. As the illustrated memory unit 15, for example, a read only memory (ROM), a random access memory (RAM), a flash memory, and the like are comprehensively illustrated.

The memory unit 15 may be a memory area built into a microcomputer chip as the camera control unit 14 or may be configured by a separate memory chip.

Programs and the like used by the camera control unit 14 are stored in the ROM, the flash memory, and the like of the memory unit 15. The ROM, the flash memory, and the like store an operating system (OS) for the CPU to control each unit, content files such as image files, and application programs, firmware, and the like for various operations.

The camera control unit 14 executes the program to control the entire imaging apparatus 1 and the lens barrel 3.

The RAM of the memory unit 15 is used as a work area of the camera control unit 14 by temporarily storing data, programs, and the like used in various data processing executed by the CPU of the camera control unit 14.

The lens barrel control unit 18 of the lens barrel 3 includes, for example, a microcomputer, and outputs a control signal to the driver unit 17 to actually drive various lenses of the optical system 16 on the basis of an instruction from the camera control unit 14.

Note that information communication between the camera control unit 14 and the lens barrel control unit 18 may be enabled only in a state where the lens barrel 3 is attached to the camera housing 2, or may be enabled in a state where the lens barrel 3 is not attached to the camera housing 2 by wireless communication.

The lens barrel control unit 18 transmits information on the exit pupil position and the pupil distance of the exit pupil to the camera control unit 14 on the basis of types and drive positions of various lenses included in the optical system 16. Specifically, information regarding the pupil distance is acquired from the information stored in the ROM as the memory unit 20 and transmitted to the camera control unit 14.

The driver unit 17 is provided with, for example, a motor driver for a zoom lens drive motor, a motor driver for a focus lens drive motor, a diaphragm mechanism driver for a motor that drives the aperture mechanism, and the like.

Each driver supplies a drive current to a corresponding drive motor according to an instruction from the lens barrel control unit 18.

The operation unit 19 of the lens barrel 3 represents an operator provided on the lens barrel 3 side. The operation information by the operation unit 19 is supplied to the lens barrel control unit 18, and is notified to the camera control unit 14 via the lens barrel control unit 18.

Operation control of the optical system 16 by the lens barrel control unit 18 and various settings and operation control by the camera control unit 14 are performed according to the operation of the operation unit 19.

The operation unit 19 may function as a reception unit of an external operation device such as a remote controller separate from the lens barrel 3.

The memory unit 20 includes a ROM, a flash memory, and the like, and stores programs, data, and the like used by the lens barrel control unit 18. The memory unit 20 stores an operating system (OS) for the CPU to control each unit, application programs for various operations, firmware, and the like.

Furthermore, the information stored in the memory unit 20 includes information such as the pupil distance of the exit pupil of the optical system 16.

2. Configuration of Imaging Element

A configuration of the imaging element 7 will be described with reference to FIG. 5.

The imaging element 7 is formed by arranging pixels in a matrix in a row direction and a column direction. Each pixel 21 is one of a light shielding pixel 21A provided with a light shielding portion that shields a part of light incident on one pixel and a PD division pixel 21B configured by two division pixels.

The imaging element 7 includes a first pixel row 22A that includes the light shielding pixels 21A to output the phase difference signal of the PD light shielding method, and a second pixel row 22B that includes only the PD division pixels 21B to output the phase difference signal of the PD division method.

The first pixel row 22A is disposed discretely in the vertical direction, and a plurality of rows of second pixel rows 22B are disposed between the first pixel row 22A and the first pixel row 22A. The first pixel rows 22A may be disposed regularly or may be disposed irregularly. However, it is possible to suppress the design cost and the manufacturing cost related to the manufacturing of the imaging element 7 when the imaging elements 7 are disposed regularly.

Each of the PD division pixels 21B included in the second pixel row 22B is covered with a color filter of a Bayer array, and is one of one having spectral sensitivity of red (R), one having spectral sensitivity of green (G), and one having spectral sensitivity of blue (B) depending on the type of color filter.

The configuration of the light shielding pixel 21A will be described with reference to the schematic diagram of FIG. 6.

The light shielding pixel 21A includes a PD 30, a light shielding portion 31 disposed in front of the PD 30 (subject side), an inner lens 32 disposed in front of the light shielding portion 31, a color filter (cyan) 33 disposed in front of the inner lens 32, and an on-chip micro-lens 34 disposed in front of the color filter 33.

Note that the inner lens 32 and the color filter 33 may not be provided in the light shielding pixel 21A.

The PD 30 is a light receiving element on which a part of the light passing through the exit pupil EP is incident, but can receive light only in a partial region in the light receiving region of the PD 30 by the light shielding portion 31 disposed in front.

That is, the light shielding portion 31 is formed to cover the left half region of the PD 30. A right opening 35R is formed in the light shielding portion 31.

The inner lens 32 and the on-chip micro-lens 34 are optical components provided to efficiently condense light, which passes through the exit pupil EP and enters one pixel, on the PD 30.

The color filter 33 is, for example, a filter having cyan (Cy) spectral sensitivity.

Figure 6:
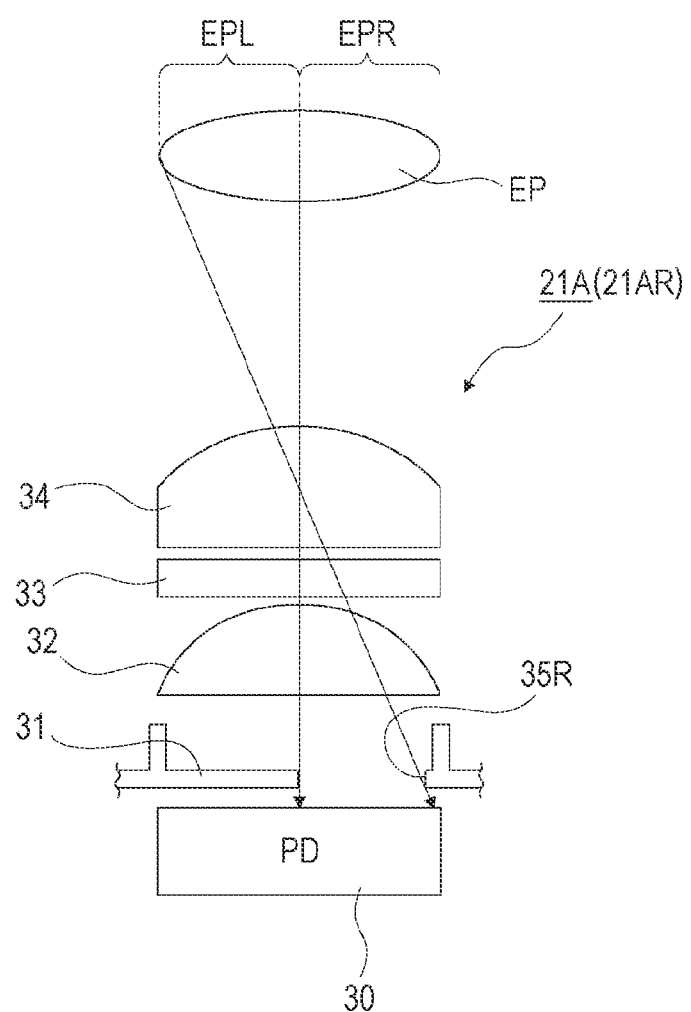
FIG. 6 is a configuration example of light shielding pixels disposed in an on-axis region.

As illustrated in FIG. 6, the PD 30 is configured to receive only light passing through a left region (hereinafter, described as a "left pupil region EPL") which is a left half region of the exit pupil EP. That is, light passing through a right region (hereinafter, described as a "right pupil region EPR") which is a right half region of the exit pupil EP is shielded by the light shielding portion 31 and does not reach the PD 30. Therefore, the pupil division function is realized.

The light shielding pixel 21A configured to receive light passing through the left pupil region EPL as illustrated in FIG. 6 is referred to as a light shielding pixel 21AR because light is received in a region deviated to the right side on the light-receiving surface. That is, in the light shielding pixel 21AR, the right opening 35R is formed.

Furthermore, the light shielding pixel 21A having a mirror-symmetrical configuration with respect to the configuration illustrated in FIG. 6 is the light shielding pixel 21A configured to receive light passing through the right pupil region EPR, and this pixel receives light in a region deviated to the left side on the light receiving surface, and is thus referred to as a light shielding pixel 21AL. A left opening 35L is formed in the light shielding portion 31 included in the light shielding pixel 21AL.

Figure 5:
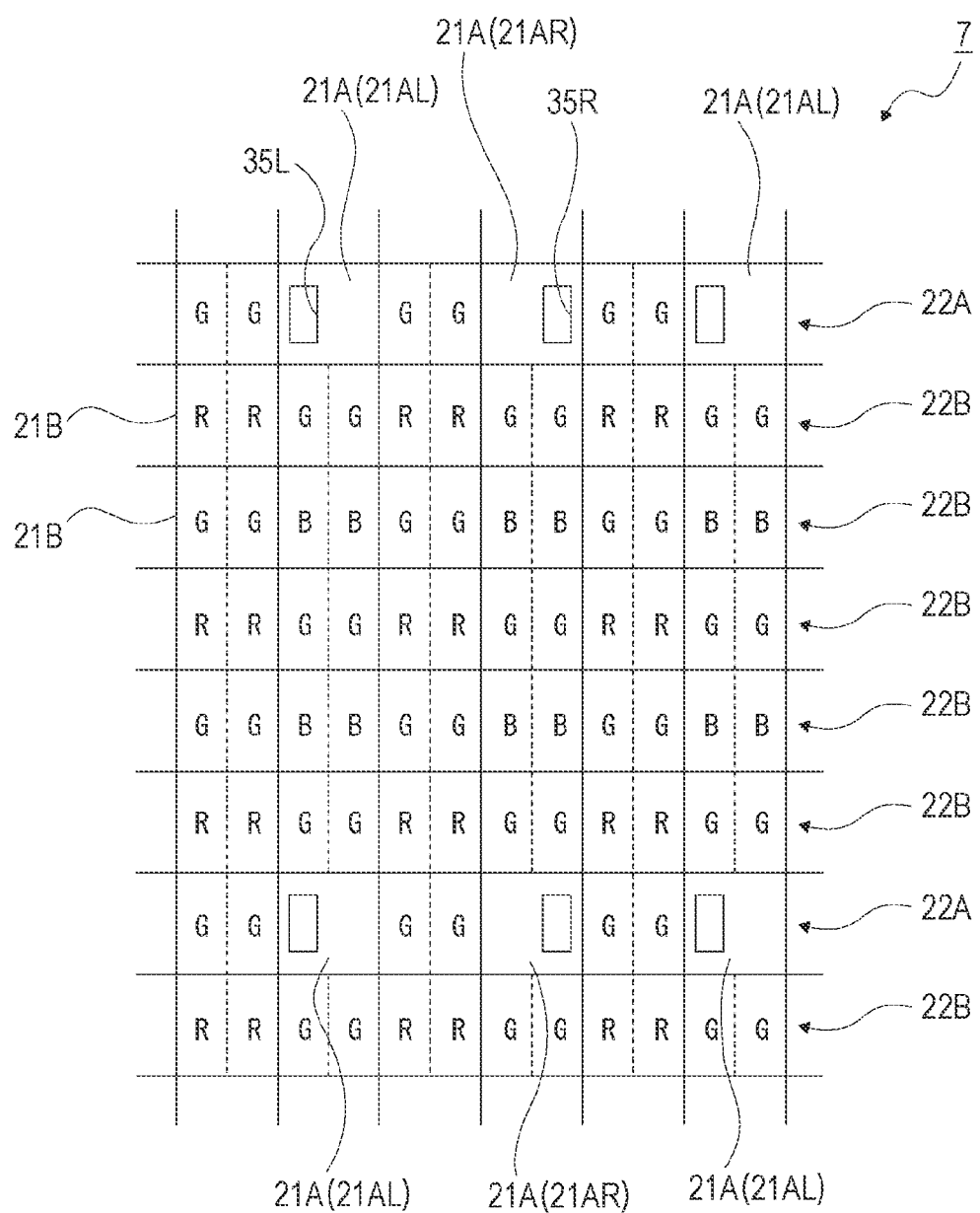
FIG. 5 is a configuration example of an imaging element.

As illustrated in FIG. 5, the distance between the light shielding pixel 21AR and the light shielding pixel 21AL is, for example, a distance corresponding to two pixels, and are alternately disposed.

The signal output from the light shielding pixel 21AR and the signal output from the light shielding pixel 21AL are handled as a pair of phase difference signals by the camera signal processing unit 8 (or the camera control unit 14). That is, the defocus amount calculation unit 8a of the camera signal processing unit 8 in the subsequent stage calculates the defocus amount using the phase difference between the signal output from the light shielding pixel 21AR and the signal output from the light shielding pixel 21AL.

Next, the PD division pixel 21B will be described.

Figure 7:
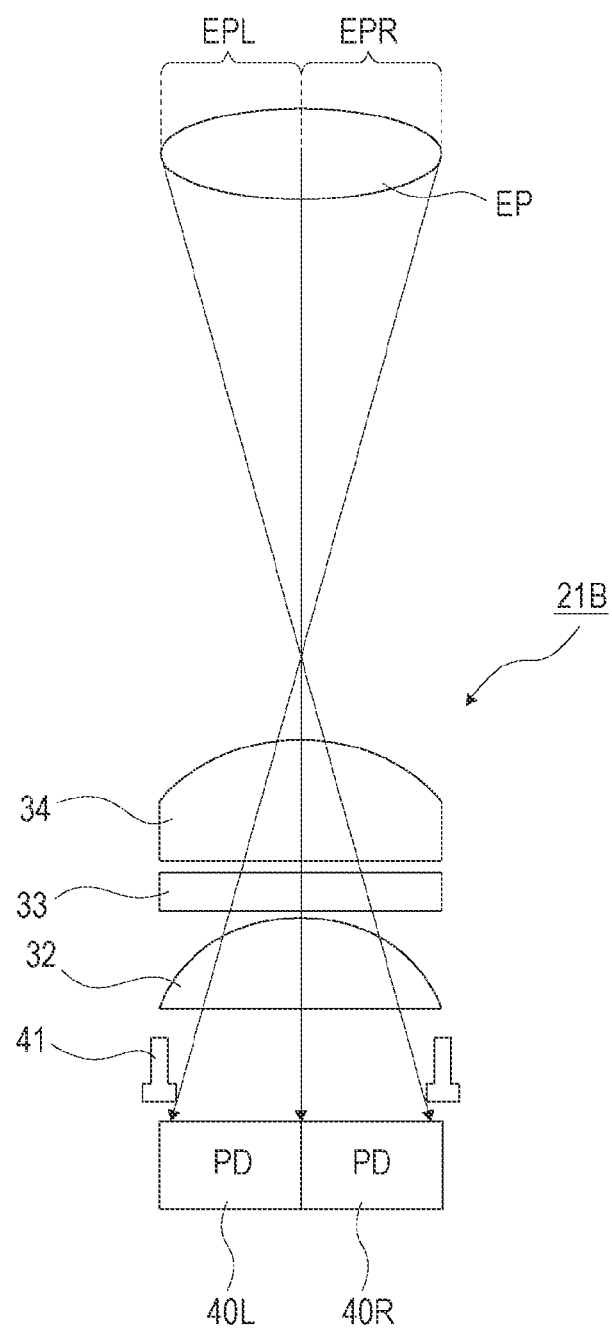
FIG. 7 is a configuration example of PD division pixels disposed in the on-axis region.

FIG. 7 is a diagram schematically illustrating a configuration of the PD division pixel 21B as the pixel 21 in the imaging element 7.

The PD division pixel 21B includes two division pixels, that is, a left PD 40L as a left division pixel and a right PD 40R as a right division pixel, a pixel boundary metal 41 disposed in front of the division pixels, an inner lens 32, a color filter 33, and an on-chip micro-lens 34. The color filter 33 is any one of a color filter 33R having spectral sensitivity of red (R), a color filter 33G having spectral sensitivity of green (G), and a color filter 33B having spectral sensitivity of blue (B).

Note that the inner lens 32 and the like may not be provided in the PD division pixel 21B.

As illustrated, the left PD 40L receives light that has passed through the right pupil region EPR of the exit pupil EP. The right PD 40R receives light that has passed through the left pupil region EPL. Therefore, the pupil division function is realized.

3. AF Control

An AF control method for focusing using each pixel 21 described above will be described.

First, AF control using the phase difference signal output from the light shielding pixel 21A or the PD division pixel 21B will be described.

The phase difference signal will be described using the light shielding pixel 21A as an example.

Figure 8:
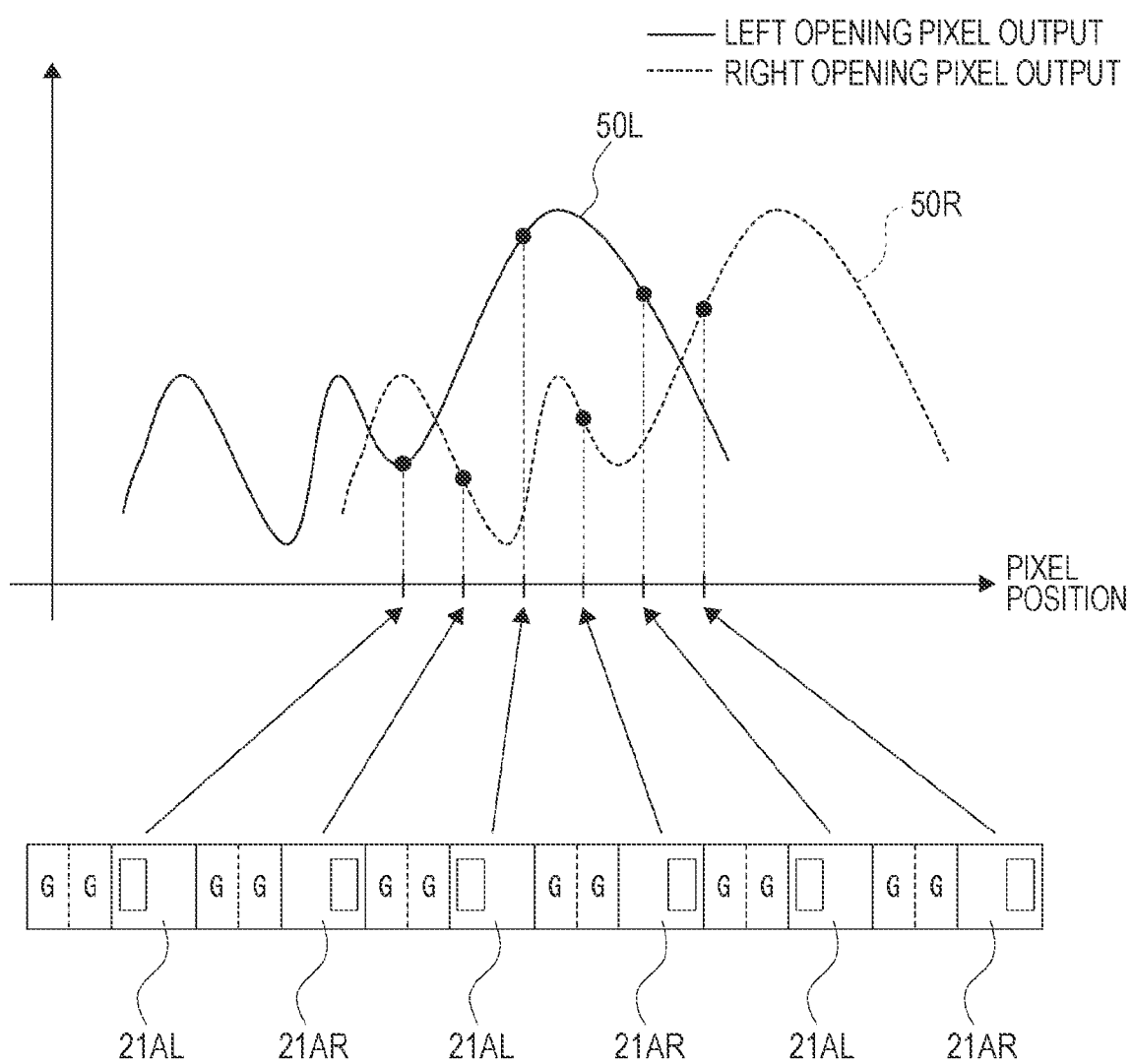
FIG. 8 is an example of output signals of a first pixel row.

FIG. 8 is a graph illustrating a relationship between the position and the output of the light shielding pixel 21A for a certain first pixel row 22A on the imaging element 7.

A signal output from the light shielding pixel 21AL in which the left opening 35L is formed is indicated by a solid line. Furthermore, a signal output from the light shielding pixel 21AR in which the right opening 35R is formed is indicated by a broken line. A solid line graph is defined as a left opening pixel output 50L, and a broken line graph is defined as a right opening pixel output 50R.

Figure 9:
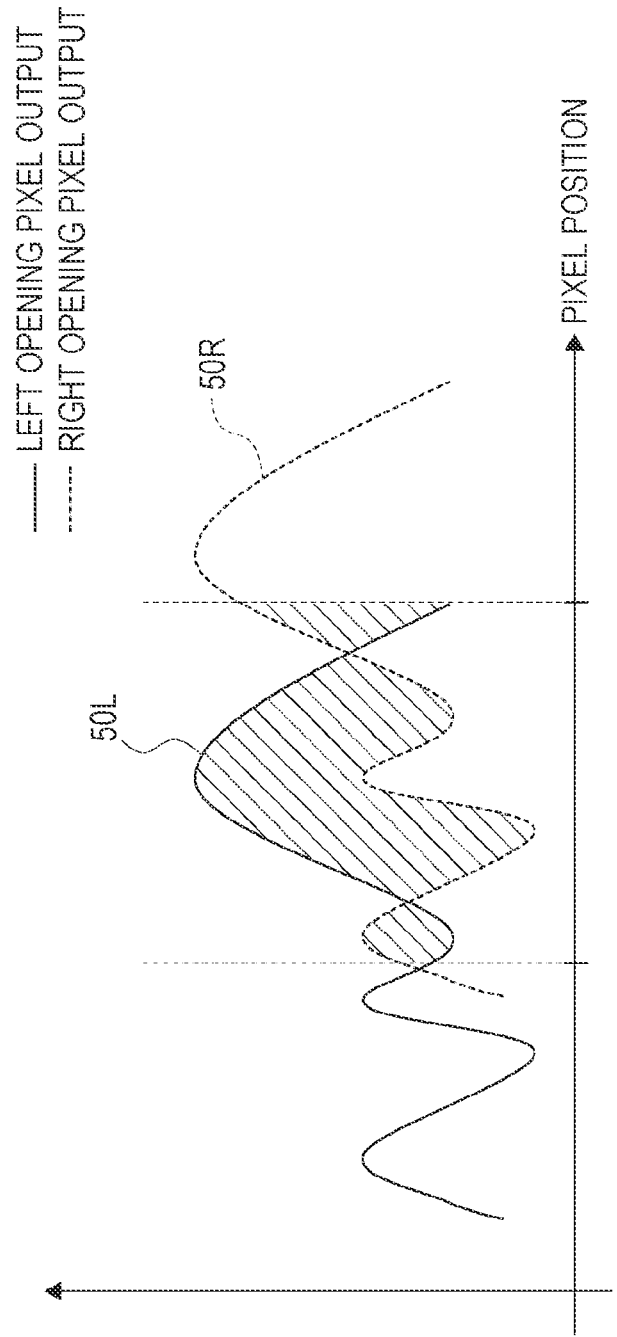
FIG. 9 is a diagram for illustrating a differential integral value between a left opening pixel output and a right opening pixel output.

A differential integral value between the waveform of the left opening pixel output 50L and the waveform of the right opening pixel output 50R is indicated by a hatched portion in FIG. 9.

Figure 10:
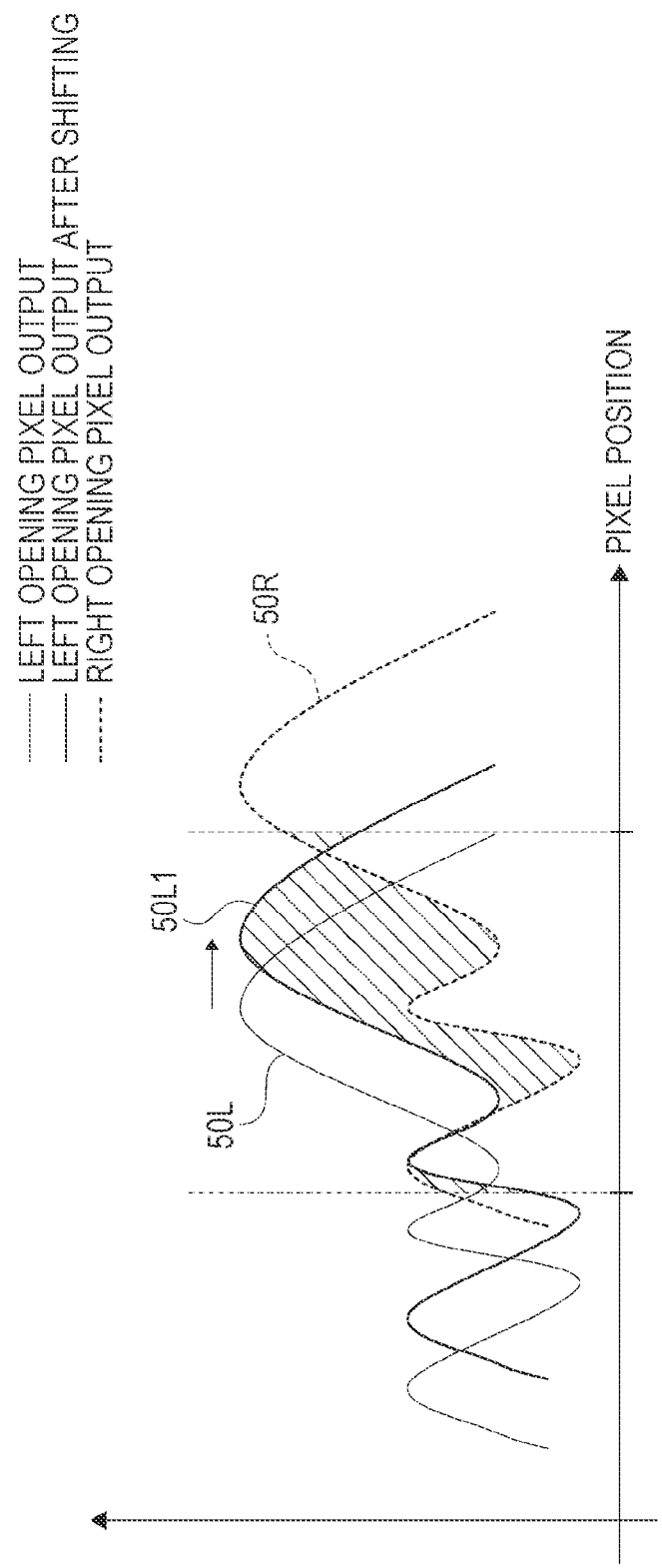
FIG. 10 is a diagram for illustrating a differential integral value of the shifted left opening pixel output and the right opening pixel output.

Next, a waveform obtained by shifting the waveform of the left opening pixel output 50L in the right direction of the graph by a certain distance is illustrated as a waveform 50L1 in FIG. 10. A hatched portion in FIG. 10 indicates a differential integral value between the waveform 50L1 and the right opening pixel output 50R.

Figure 11:
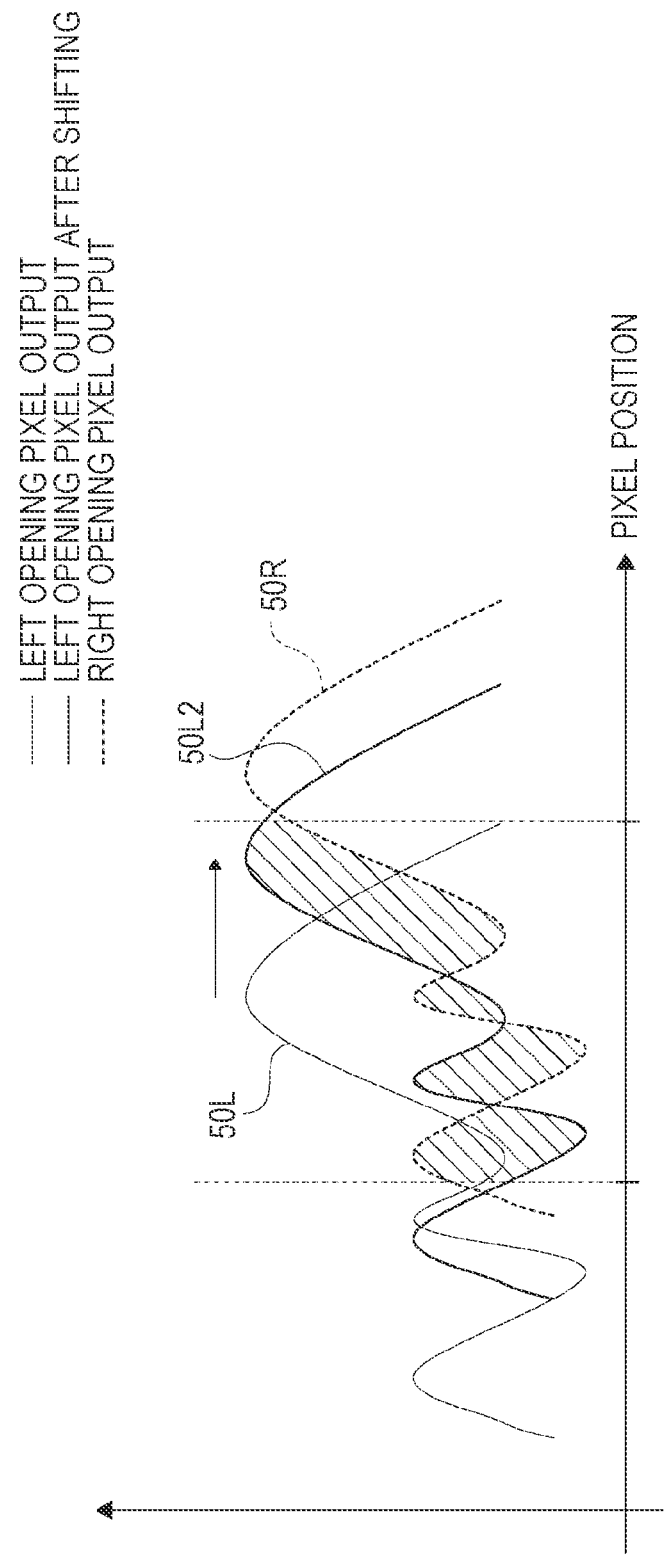
FIG. 11 is a diagram for illustrating the differential integral value of the shifted left opening pixel output and the right opening pixel output.

A waveform obtained by further shifting the waveform 50L1 in the right direction by a certain distance is illustrated as a waveform 50L2 in FIG. 11. The hatched portion in FIG. 11 indicates the differential integral value between the waveform 50L2 and the right opening pixel output 50R.

Figure 12:
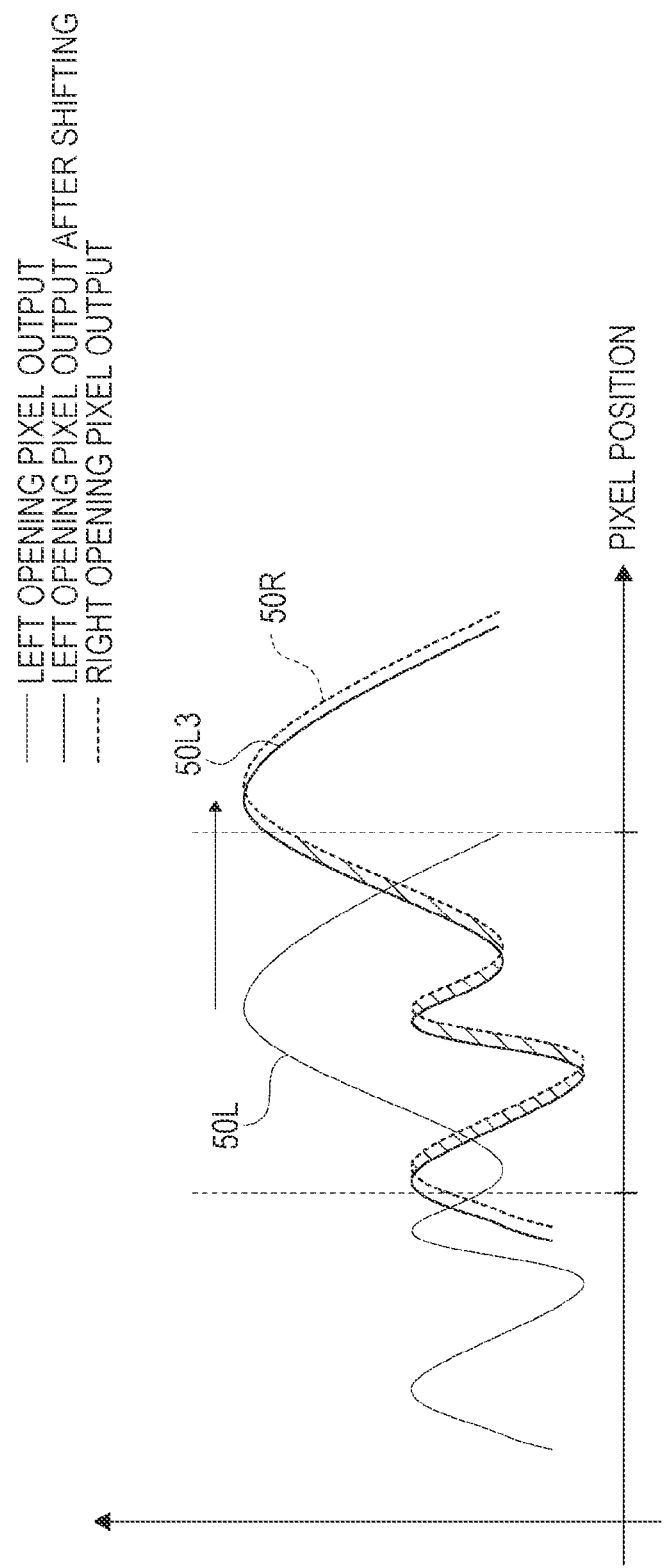
FIG. 12 is a diagram for illustrating the differential integral value of the shifted left opening pixel output and the right opening pixel output.

A waveform obtained by further shifting the waveform 50L2 in the right direction by a certain distance is illustrated as a waveform 50L3 in FIG. 12. The hatched portion in FIG. 12 indicates the differential integral value between the waveform 50L3 and the right opening pixel output 50R.

Figure 13:
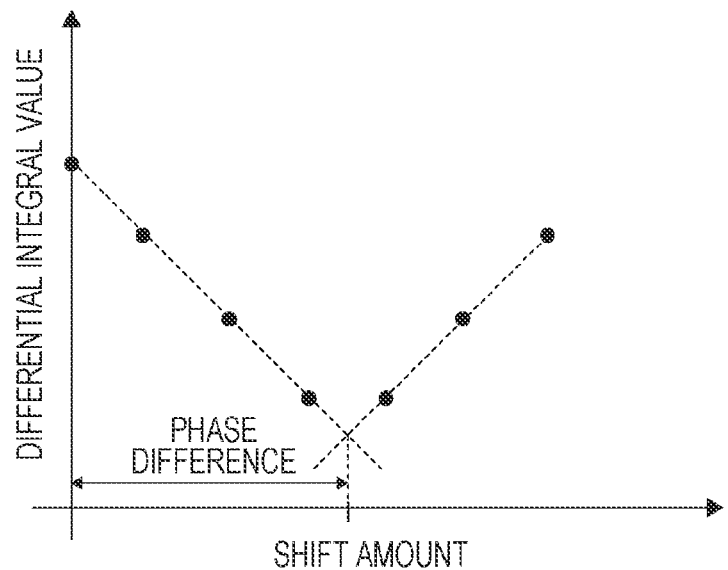
FIG. 13 is a diagram illustrating a relationship between the differential integral value and a shift amount.

A graph of the differential integral values indicated by the hatched portions in FIGS. 9, 10, 11, and 12 is illustrated in FIG. 13.

As illustrated in the drawing, the differential integral value decreases as the shift amount increases, and when the predetermined shift amount is exceeded, the differential integral value increases again as the shift amount is increased.

The shift amount with the smallest differential integral value is the phase difference. That is, appropriate AF control can be performed by moving the focus lens so that the outputs of the light shielding pixel 21AL and the light shielding pixel 21AR are phase-differentially shifted and the waveforms of the left opening pixel output 50L and the right opening pixel output 50R substantially overlap.

Note that the so-called front pin and the rear pin can be distinguished depending on the direction in which the waveform of the left opening pixel output 50L is shifted. That is, in the state of FIG. 9, the differential integral value can be minimized by shifting the waveform of the left opening pixel output 50L in the right direction. This state is a so-called front pin state.

On the other hand, in a case where the differential integral value can be made the minimum value by shifting the waveform of the left opening pixel output 50L in the left direction, a so-called rear pin state is set.

Note that, in detail, since the light shielding pixel 21AL and the light shielding pixel 21AR are separated by two pixels on the imaging element 7, an optimum in-focus state can be created by moving the focus lens so that the waveforms of the left opening pixel output 50L and the right opening pixel output 50R are shifted by two pixels.

Figure 14:
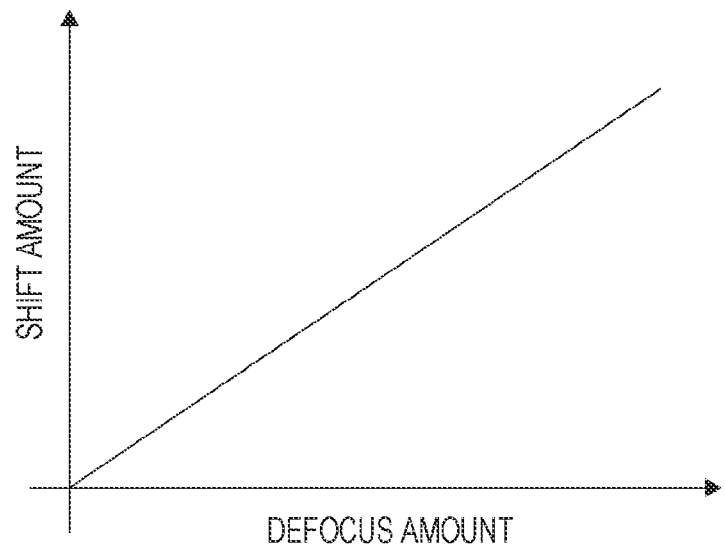
FIG. 14 is a diagram illustrating a relationship between the shift amount and a defocus amount.

FIG. 14 illustrates a relationship between the shift amount and a defocus amount. The shift amount is a shift amount in which the differential integral value illustrated in FIG. 13 is originally reduced, and can be rephrased as a phase difference. The relationship between the shift amount and the defocus amount is expressed by a linear function. The larger the shift amount, the larger the defocus amount, and a state in which the shift amount is large is, that is, a state in which focus is not achieved. The defocus amount can be calculated from the shift amount.

Although the AF control based on the phase difference signal output from the light shielding pixel 21A has been described so far, the AF control based on the phase difference signal output from the PD division pixel 21B can be similarly performed.

Specifically, the defocus amount can be obtained by comparing the waveform of the signal output from the left PD 40L of the PD division pixel 21B (corresponding to the left opening pixel output 50L in each drawing) with the waveform of the signal output from the right PD 40R (corresponding to the right opening pixel output 50R in each drawing) and calculating a shift amount for substantially matching these waveforms.

Note that, in a case where the defocus amount with high reliability cannot be calculated from the signal output from the light shielding pixel 21A or the PD division pixel 21B, it is conceivable to calculate the defocus amount using a contrast method.

For example, a contrast is detected on the basis of a luminance signal generated in the camera signal processing unit 8, and focus control is performed.

Note that the contrast method described here is an example, and the defocus amount can be calculated by the contrast method using various known methods.

4. On-Axis Region and Off-Axis Region

In the imaging element 7, the configuration of the pixel 21 may be different between a region near the center and other regions. Specifically, a region near the center of the imaging element 7 will be described as an on-axis region ArC, and other regions will be described as an off-axis region ArM.

Figure 15:
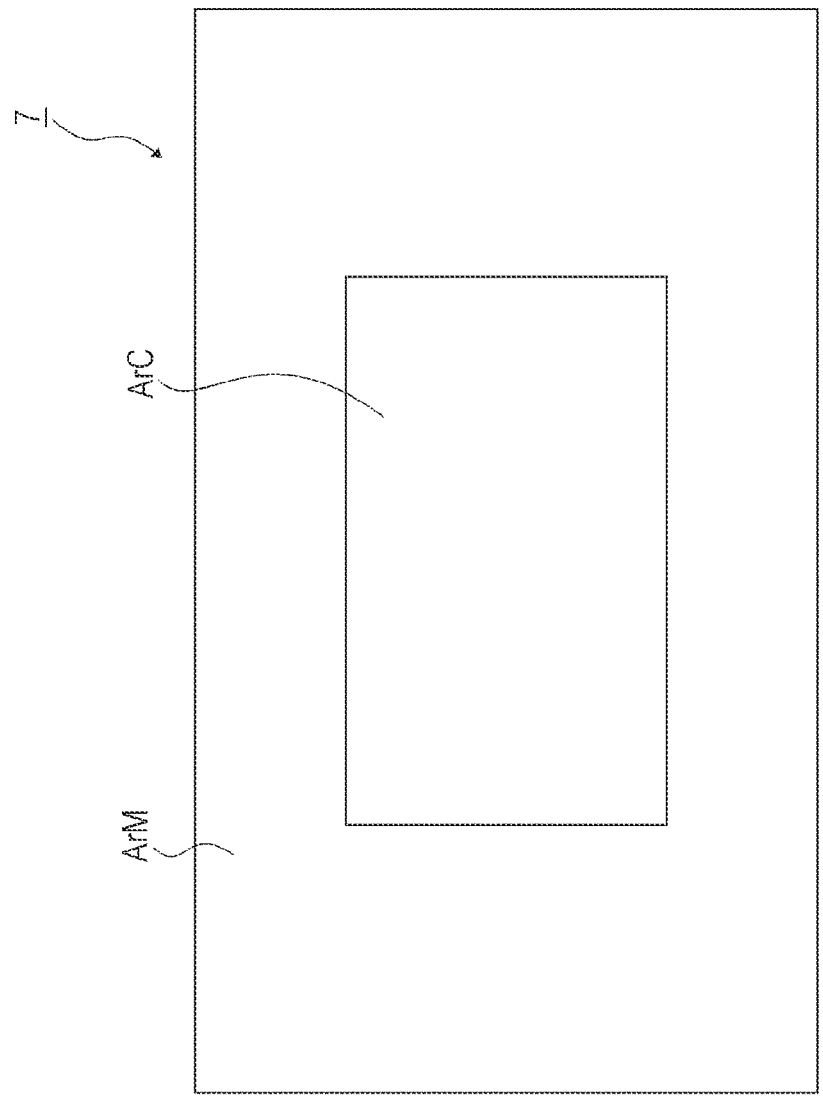
FIG. 15 is a diagram for illustrating an on-axis region and an off-axis region.

Note that FIG. 15 illustrates an example of the on-axis region ArC and the off-axis region ArM, but the on-axis region ArC may be a substantially circular region or may have other shapes. Furthermore, whether each pixel belongs to the on-axis region ArC or the off-axis region ArM is stored in the memory unit 15 in advance. Therefore, the camera control unit 14 can determine whether the pixel or the region belongs to the on-axis region ArC or the off-axis region ArM by referring to the memory unit 15.

Figure 16:
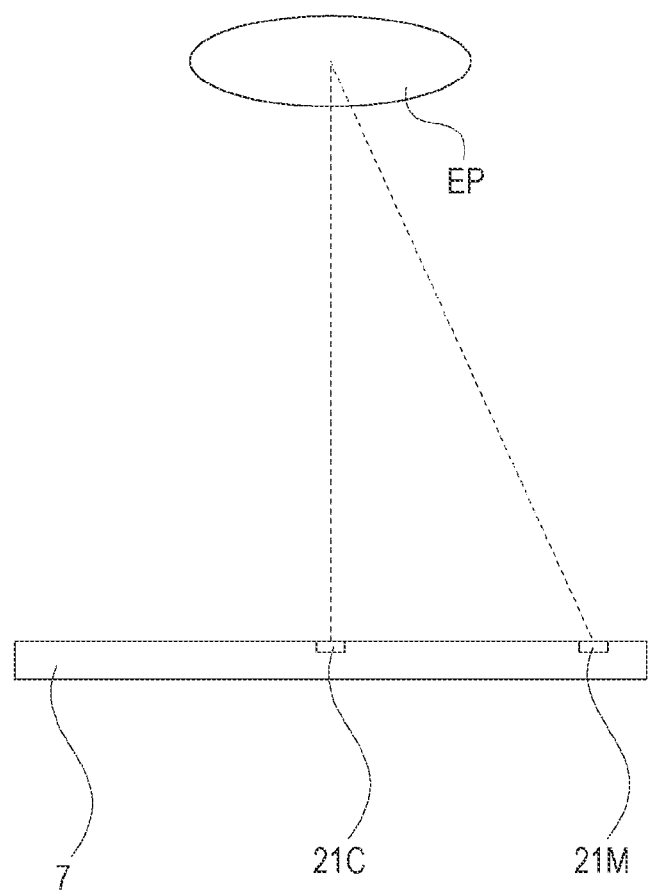
FIG. 16 is an explanatory diagram of positions of pixels on the imaging element.

As illustrated in FIG. 16, the pixels 21C disposed in the on-axis region ArC receive light incident from a direction substantially orthogonal to the light receiving surface. On the other hand, the pixels 21M disposed in the off-axis region ArM receive light incident on the light receiving surface from an oblique direction as illustrated in the drawing.

Each pixel 21 of the imaging element 7 is configured such that each portion is offset toward the central portion side as it is positioned at a distance farther from the central portion.

The light shielding pixel 21AR illustrated in FIG. 6 is an example of the pixels 21C disposed substantially at the center of the on-axis region ArC, for example.

The light shielding pixel 21AR as the pixels 21M disposed in the off-axis region ArM will be described with reference to FIG. 17.

As illustrated in the drawing, the inner lens 32 and the color filter 33 are disposed to be offset toward the exit pupil EP side with respect to the PD 30 and the light shielding portion 31. Furthermore, the on-chip micro-lens 34 is disposed offset toward the exit pupil EP side with respect to the inner lens 32 and the color filter 33.

With such a configuration, light obliquely incident from the exit pupil EP can be efficiently incident on the PD 30.

Figure 18:
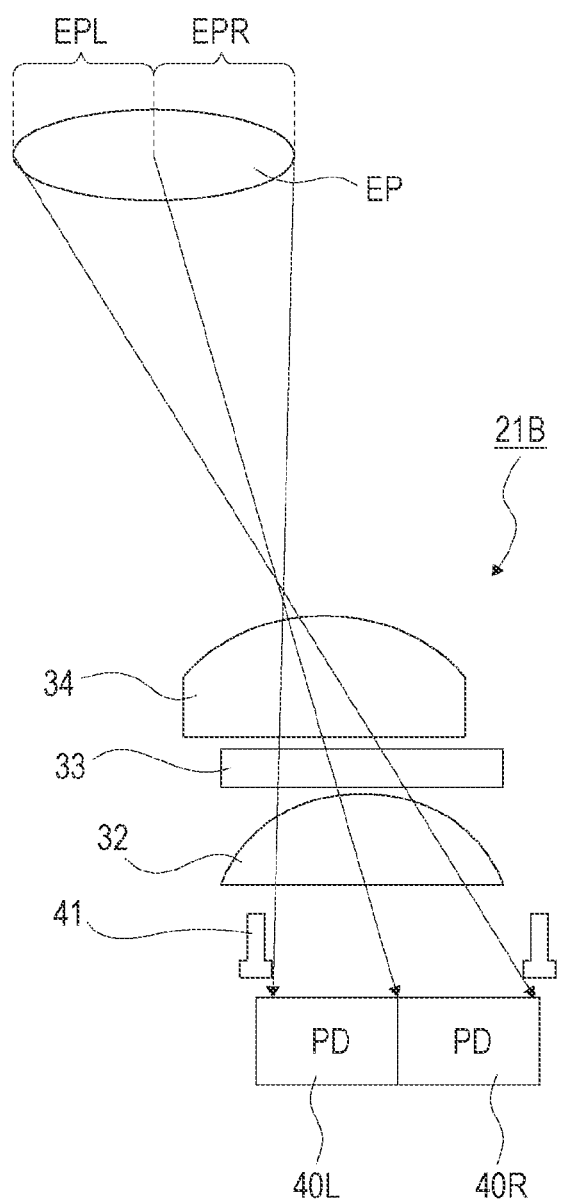
FIG. 18 is a configuration example of the PD division pixels disposed in the off-axis region.

Next, a PD division pixel 21B as pixels 21M disposed in the off-axis region ArM is illustrated in FIG. 18.

As illustrated, the pixel boundary metal 41 is disposed in front of the left PD 40L and the right PD 40R, and the inner lens 32 and the color filter 33 are disposed in front of the pixel boundary metal 41 to be offset toward the exit pupil EP side with respect to the pixel boundary metal 41. Furthermore, the on-chip micro-lens 34 is disposed offset toward the exit pupil EP side with respect to the inner lens 32 and the color filter 33.

Regardless of whether the pixel 21 is the light shielding pixel 21A or the PD division pixel 21B, the offset amount of each unit such as the inner lens 32 and the color filter 33 is determined according to the arrangement position of the pixel 21. Therefore, it becomes easy to form each part on the imaging element 7.

Furthermore, since each part is offset, light obliquely incident from the exit pupil EP can be efficiently incident on the left PD 40L and the right PD 40R, and light passing through the left pupil region EPL is incident on the right PD 40R, and light passing through the right pupil region EPR is incident on the left PD 40L. That is, the pupil division function is realized.

5. Pupil Distance and Pixel Configuration

The angle of the light incident on the pixel 21 is also affected by the distance between the exit pupil and the imaging element 7. The shorter the distance between the exit pupil and the imaging element 7, the larger the angle of incidence on the pixel 21. When the incident angle changes, the light receiving region of the PD 30 that receives the light having passed through the left pupil region EPL changes.

Figure 17:
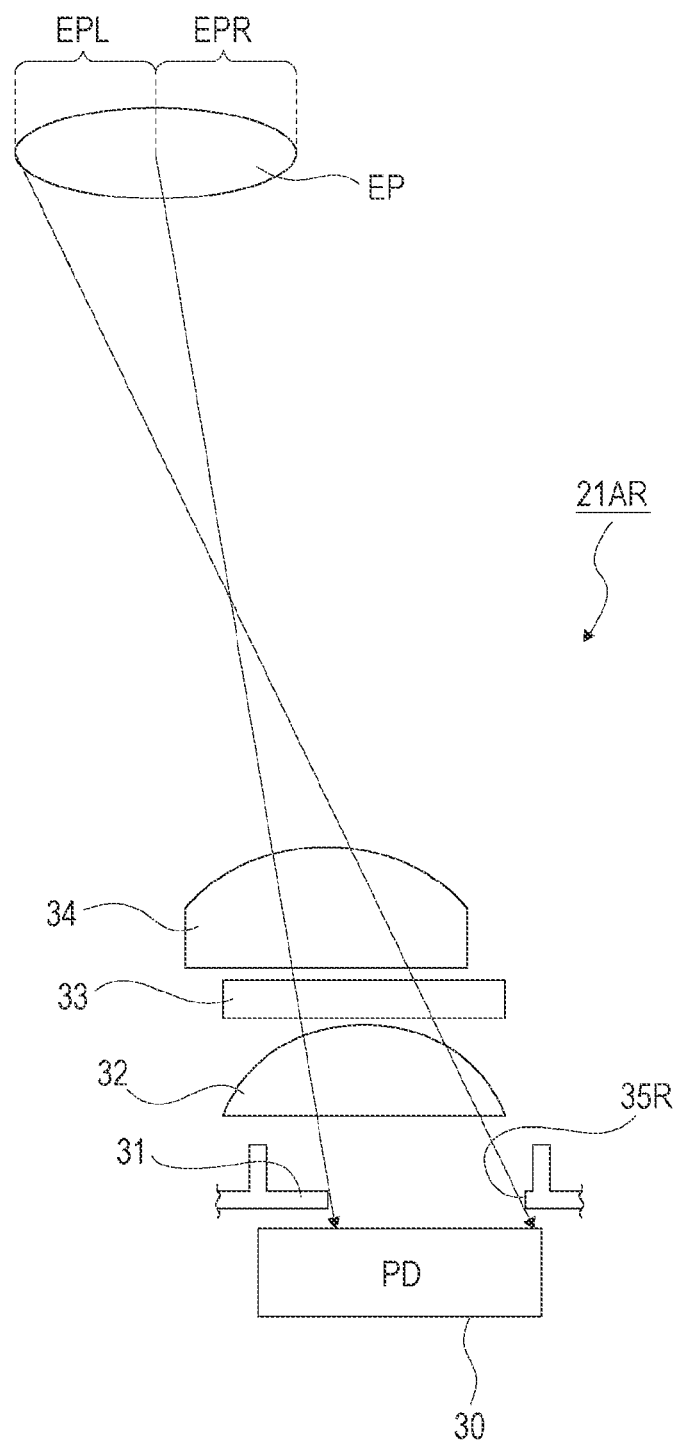
FIG. 17 is a configuration example of the light shielding pixels disposed in the off-axis region.

For example, FIG. 17 illustrates a configuration in a case where the pupil distance of the exit pupil EP is a predetermined distance, and the right opening 35R is larger than half of the surface area of the PD 30.

In a case where the lens barrel 3 is an interchangeable lens, the pupil distance of the exit pupil EP changes depending on the type of the optical system 16. In a case where the exit pupil EP is closer than the predetermined distance, the light shielding pixel 21AR illustrated in FIG. 17 receives not only the light passing through the left pupil region EPL of the exit pupil EP but also the light passing through the right pupil region EPR.

Therefore, in the present embodiment, a plurality of types of light shielding pixels 21AR and light shielding pixels 21AL according to the pupil distance of the exit pupil EP are provided.

This will be specifically described with reference to FIGS. 17 and 19. In FIG. 17, with respect to the optical system 16 in which the pupil distance of the exit pupil EP is set to a predetermined distance, the right opening 35R of the light shielding portion 31 is formed such that the light passing through the left pupil region EPL is received by the PD 30.

Figure 19:
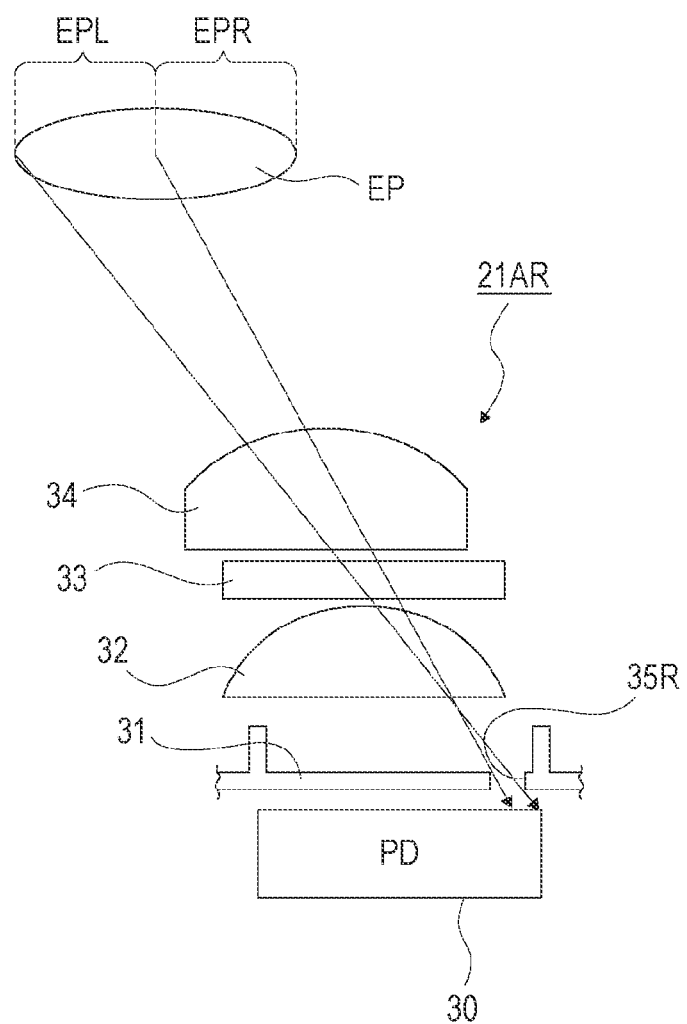
FIG. 19 is a configuration example of the light shielding pixels disposed in the off-axis region.

On the other hand, in FIG. 19, with respect to the optical system 16 in which the pupil distance of the exit pupil EP is shorter than the predetermined distance, the right opening 35R of the light shielding portion 31 is formed such that the light passing through the left pupil region EPL is received by the PD 30.

As understood from both the drawings, in order for the PD 30 to receive light that has passed through the left pupil region EPL in the optical system 16 having a short pupil distance, it is necessary to cope with incident light that is incident more obliquely.

That is, in the configuration illustrated in FIG. 19, the right opening 35R is narrowed, and the opening end of the right opening 35R on the exit pupil EP side is at a position further separated from the exit pupil EP.

By adopting such a configuration, the light shielding pixel 21AR and the light shielding pixel 21AL can be made to correspond to a case where the pupil distance of the exit pupil EP is short, and the pupil division function can be made to function.

Note that, in the light shielding pixel 21AR illustrated in FIGS. 17 and 19, the offset amounts of the inner lens 32, the color filter 33, and the on-chip micro-lens 34 are the same.

That is, only the shape of the right opening 35R of the light shielding portion 31 is different.

A plurality of light shielding pixels 21AR and light shielding pixels 21AL illustrated in FIG. 17 and a plurality of light shielding pixels 21AR and light shielding pixels 21AL illustrated in FIG. 19 are provided on the imaging element 7.

In the present example, eight types of light shielding pixels 21AR and light shielding pixels 21AL corresponding to pupil distances are disposed on the imaging element 7. That is, in the eight types of light shielding pixels 21AR and the light shielding pixels 21AL, the opening areas of the right opening 35R and the left opening 35L are different in eight stages.

In the following description, eight types of pupil distances are referred to as a pupil distance S0 to a pupil distance S7 in order from the closest pupil distance.

Then, the light shielding pixel 21AR and the light shielding pixel 21AL corresponding to the pupil distance S0 are set as the light shielding pixels RS0 and LS0. Similarly, the light shielding pixel 21AR and the light shielding pixel 21AL corresponding to the pupil distance S1 are set as light shielding pixels RS1 and LS1, the light shielding pixel 21AR and the light shielding pixel 21AL corresponding to the pupil distance S2 are set as light shielding pixels RS2 and LS2, the light shielding pixel 21AR and the light shielding pixel 21AL corresponding to the pupil distance S3 are set as light shielding pixels RS3 and LS3, the light shielding pixel 21AR and the light shielding pixel 21AL corresponding to the pupil distance S4 are set as light shielding pixels RS4 and LS4, the light shielding pixel 21AR and the light shielding pixel 21AL corresponding to the pupil distance S5 are set as light shielding pixels RS5 and LS5, the light shielding pixel 21AR and the light shielding pixel 21AL corresponding to the pupil distance S6 are set as light shielding pixels RS6 and LS6, and the light shielding pixel 21AR and the light shielding pixel 21AL corresponding to the pupil distance S7 are set as light shielding pixels RS7 and LS7.

Furthermore, a first pixel row in which the light shielding pixels RS0 and LS0 are disposed is set as a first pixel row 22A0, a first pixel row in which the light shielding pixels RS1 and LS1 are disposed is set as a first pixel row 22A1, a first pixel row in which the light shielding pixels RS2 and LS2 are disposed is set as a first pixel row 22A2, a first pixel row in which the light shielding pixels RS3 and LS3 are disposed is set as a first pixel row 22A3, a first pixel row in which the light shielding pixels RS4 and LS4 are disposed is set as a first pixel row 22A4, a first pixel row in which the light shielding pixels RS5 and LS5 are disposed is set as a first pixel row 22A5, a first pixel row in which the light shielding pixels RS6 and LS6 are disposed is set as a first pixel row 22A6, and a first pixel row in which the light shielding pixels RS7 and LS7 are disposed is set as a first pixel row 22A7.

Figure 20:
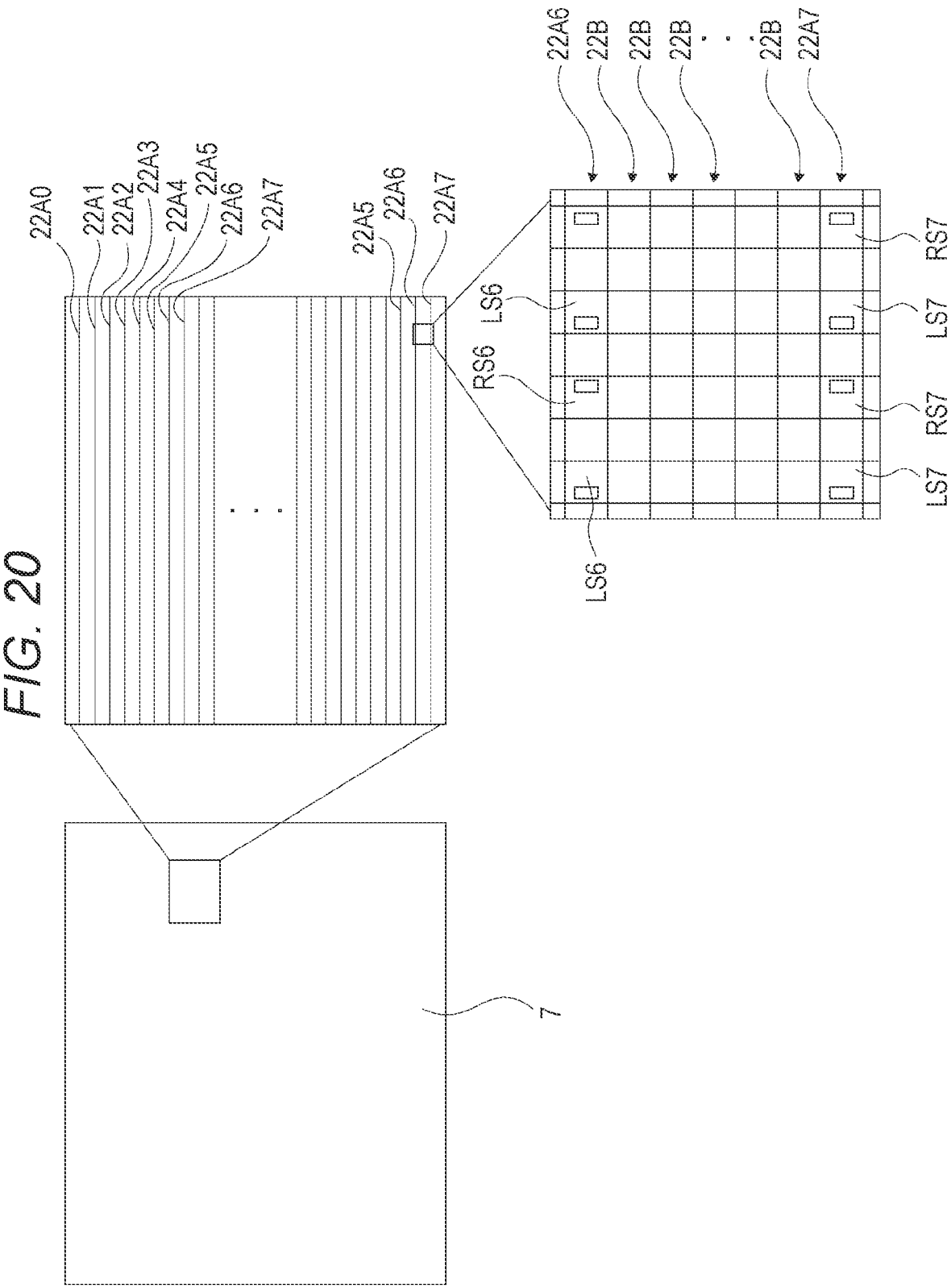
FIG. 20 is an arrangement example of the light shielding pixels according to pupil distances.

FIG. 20 illustrates an example of an arrangement mode of first pixel rows 22A0 to 22A7.

FIG. 20 is an enlarged view of a part of the imaging element 7. As illustrated in the drawing, the first pixel row 22A0 in which the light shielding pixels RS0 and LS0 are disposed and the first pixel row 22A7 in which the light shielding pixels RS7 and LS7 are disposed are disposed to be vertically separated from each other by a certain distance, and the pixel rows of the first pixel row 22A0 to the first pixel row 22A7 are periodically disposed in the vertical direction.

Each pixel row of the first pixel row 22A0 to the first pixel row 22A7 outputs a phase difference signal SG0 to a phase difference signal SG7 for calculating the defocus amount, and the defocus amount calculation unit 8a in the subsequent stage selects an appropriate phase difference signal SG according to the pupil distance of the exit pupil EP and calculates the defocus amount. For example, in a case where the pupil distance of the exit pupil EP is the pupil distance S3, the defocus amount is calculated using the phase difference signal SG3 output from the first pixel row 22A3.

Next, the relationship with the pupil distance will be described for the PD division pixel 21B as the pixel 21M disposed in the off-axis region ArM. In the PD division pixel 21B disposed in the off-axis region ArM, the condition that only the light having passed through the left pupil region EPL is incident on the right PD 40R and only the light having passed through the right pupil region EPR is incident on the left PD 40L is only the case of using the optical system 16 having the pupil distance as designed in the imaging element 7. In this case, since the light passing through the center of the exit pupil EP enters the boundary between the two division pixels, the pupil division function works appropriately.

However, in a case where the optical system 16 having a pupil distance different from the pupil distance as designed by the imaging element 7 is used, the light passing through the center of the exit pupil EP is unevenly incident on any of the division pixels. In order to cause the pupil division function to function appropriately in this state, it is conceivable to change the ratio of the sizes of the two division pixels so that light passing through the center of the exit pupil EP enters the boundary between the two division pixels. That is, like the plurality of types of light shielding pixels 21 A are provided on the imaging element 7, it is necessary to provide the PD division pixels 21B corresponding to the pupil distances S0 to S7, respectively, in the imaging element 7.

However, changing the area ratio of the two division pixels for each PD division pixel 21B has a great technical difficulty and causes an increase in manufacturing cost.

Therefore, in the imaging apparatus 1 according to the present embodiment, only the PD division pixels 21B corresponding to a specific pupil distance (for example, the pupil distance S3) are provided on the imaging element 7.

Note that, here, an example in which eight types of the light shielding pixels 21AR and the light shielding pixels 21AL are provided according to the pupil distance has been described, but other types may be provided. That is, only one type of light shielding pixel 21AR and light shielding pixel 21AL may be provided regardless of the pupil distance, or a plurality of types may be provided according to the pupil distance.

6. Difference in AF Control Due to Difference in Phase Difference Pixel

It has been described that the AF control performed on the basis of the phase difference signal output from the imaging element 7 includes a method using the light shielding pixel 21A and a method using the PD division pixel 21B.

Here, a difference therebetween will be described with reference to FIG. 21.

First, regarding the application of each pixel, the light shielding pixel 21A is a pixel dedicated to phase difference detection. That is, the pixels are pixels that are not used to generate a normal image signal. The normal image signal is a signal for generating an image of a subject. Since the light shielding pixel 21A shields a part of the light incident on the pixel region by the light shielding portion 31, the output signal of the light shielding pixel 21A is not used in generation of a normal image signal.

On the other hand, the PD division pixel 21B is a pixel used for phase difference detection and also used for generation of a normal image signal. The PD division pixel 21B can be treated as a normal pixel by adding the outputs of the left PD 40L and the right PD 40R.

As for the number of arrangements, as illustrated in FIG. 5, the number of light shielding pixels 21A is reduced, and the number of PD division pixels 21B is increased.

Since the light shielding pixels 21A cannot be used as normal pixels (that is, pixels for generating an image of a subject), a large number of the light shielding pixels cannot be disposed. Furthermore, since a large number of light shielding pixels cannot be disposed, a large number of light shielding pixels having the same light shielding region cannot be included, and output signals cannot be added. Therefore, in a case where the AF control is performed using the light shielding pixel 21A, the low illuminance performance is lowered.

On the other hand, since the PD division pixel 21B can be used as a normal pixel, a large number of PD division pixels can be disposed, and since the left PD 40L and the right PD 40R have the same size, a plurality of output signals can be added. Therefore, the S/N ratio can be improved, and the low illuminance performance is high.

Pupil correction design flexibility will be described.

In the light shielding pixel 21A, it is relatively easy to separately create the light shielding portions 31 having different light shielding areas. Therefore, since it is easy to provide a plurality of types of light shielding pixels 21A according to a plurality of pupil distances (Light shielding pixels RS0 to RS7 and LS0 to LS7), it is possible to output a phase difference signal with high reliability even if the pupil distances are different. Therefore, the light shielding pixel 21A has pupil correction design flexibility.

On the other hand, since it is difficult to manufacture the PD division pixel 21B by changing the ratio of the sizes of the left PD 40L and the right PD 40R, it is difficult to provide a plurality of types of PD division pixels 21B according to a plurality of pupil distances. Therefore, in the present embodiment, only the PD division pixels 21B corresponding to a specific pupil distance are provided on the imaging element 7. Therefore, if the pupil distance is different from the design, the reliability of the phase difference signal decreases. That is, the PD division pixel 21B has no pupil correction design flexibility.

The off-axis performance corresponds to the pupil correction design flexibility. The off-axis performance is the accuracy of AF control on the subject exposed in the off-axis region ArM that is a region other than the on-axis region ArC that is a rectangular region set in the vicinity of the center of the imaging element 7.

Since the light shielding pixel 21A has a pupil correction design flexibility, even if light passing through the exit pupil EP is obliquely incident on the light shielding pixel 21A located in the off-axis region ArM, an appropriate phase difference signal is output in any of the light shielding pixels RS0 to RS7 and the light shielding pixels LS0 to LS7. Therefore, the off-axis performance of the light shielding pixel 21A is high.

On the other hand, since the PD division pixel 21B does not have pupil correction design flexibility, in a case where the pupil distance is different from the design, when the light passing through the exit pupil EP is obliquely incident on the PD division pixel 21B located in the off-axis region ArM, the pupil division function does not function well, and the reliability of the output phase difference signal is lowered. Therefore, off-axis performance when the PD division pixel 21B is used is lower than that when the light shielding pixel 21A is used.

7. Selection of Phase Difference Signal

In the present embodiment, which phase difference signal is selected among the phase difference signals output from the light shielding pixel 21A and the PD division pixel 21B when the defocus amount is calculated will be described with reference to FIG. 22.

Figure 22:
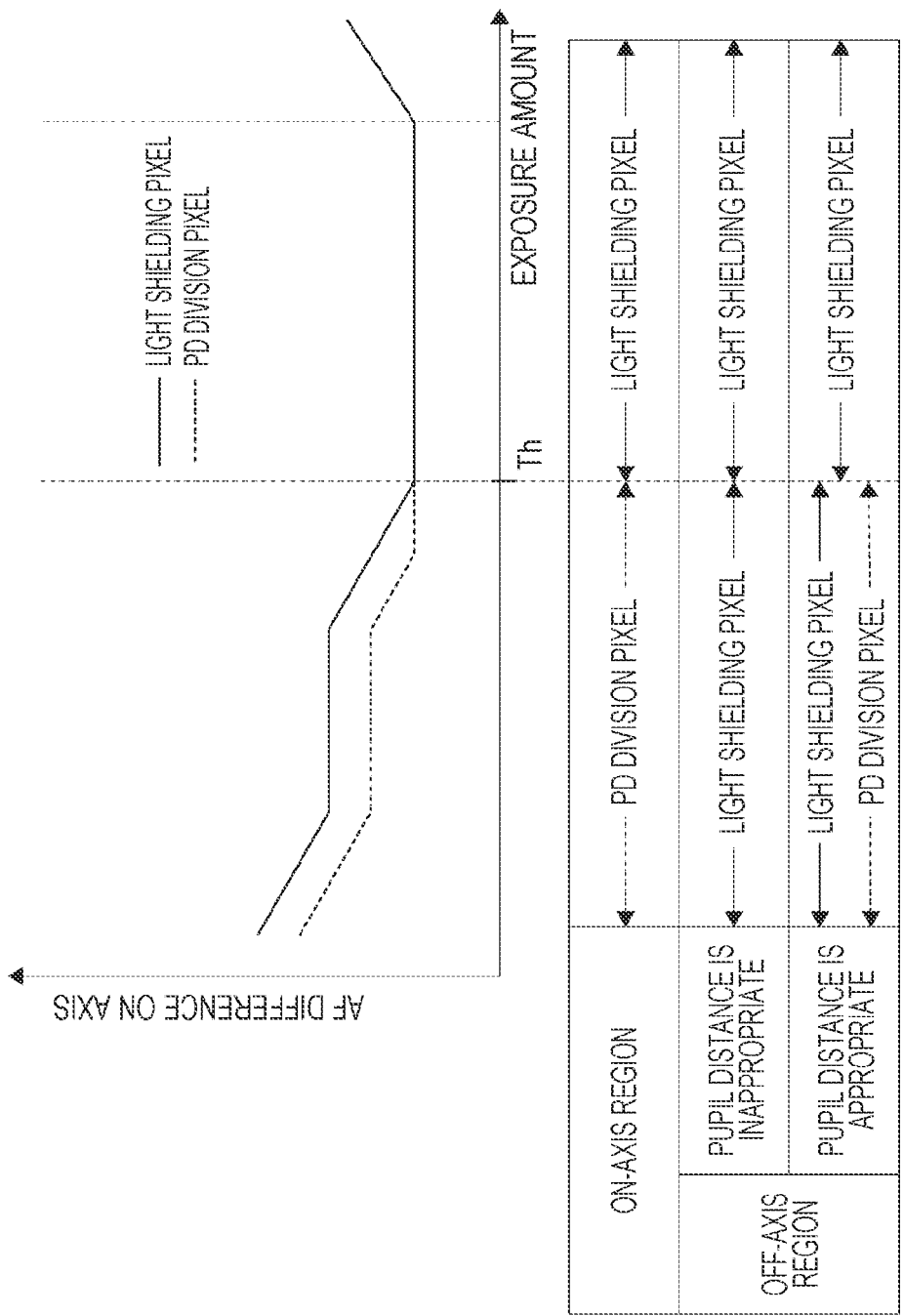
FIG. 22 is a diagram for illustrating the exposure amount and an AF error, and a phase difference signal selected under each condition.

The graph in the upper part of FIG. 22 illustrates a change in the AF error in the on-axis region ArC with respect to the exposure amount. A solid line in the graph indicates a case where the AF control based on the phase difference signal output from the light shielding pixel 21A is performed. Furthermore, a broken line in the graph indicates a case where the AF control based on the phase difference signal output from the PD division pixel 21B is performed.

The lower part of the graph of FIG. 22 illustrates the phase difference signal selected for every combination of the exposure amount and the AF control target region.

First, it is conceivable to select either the phase difference signal output from the light shielding pixel 21A or the PD division pixel 21B according to the exposure amount. For example, in a case where the exposure amount is equal to or larger than the threshold value Th, the phase difference signal output from the light shielding pixel 21A is selected. This is because the phase difference signal output from the light shielding pixel 21A has a short read time (specifically, described later), and it is desirable to select the phase difference signal output from the light shielding pixel 21A if there is no problem in calculation of the defocus amount.

On the other hand, in a case where the exposure amount is less than the threshold value Th, if the phase difference signal output from the light shielding pixel 21A is selected, the reliability of the calculated defocus amount is lowered. Therefore, it is conceivable to select the phase difference signal output from the PD division pixel 21B. Note that, in the present example, in a case where the exposure amount is less than the threshold value Th, one of the phase difference signals output from the light shielding pixel 21A and the PD division pixel 21B or the contrast method is selected in consideration of other conditions.

A specific description will be given.

In a case where the exposure amount is equal to or larger than the threshold value Th, the phase difference signal output from the light shielding pixel 21A is selected regardless of whether the region is the on-axis region ArC or the off-axis region ArM. Reading of charges obtained by photoelectrically converting light received by the light shielding pixel 21A and the PD division pixel 21B in a case where the exposure amount is equal to or larger than the threshold value Th will be described with reference to FIGS. 23 and 24.

The signal output from the light shielding pixel 21A is read out for each pixel row as a phase difference signal SGn. The phase difference signal SGn is one of phase difference signals SG0 to SG7, and the appropriate phase difference signal SGn is selected according to the pupil distance.

Figure 24:
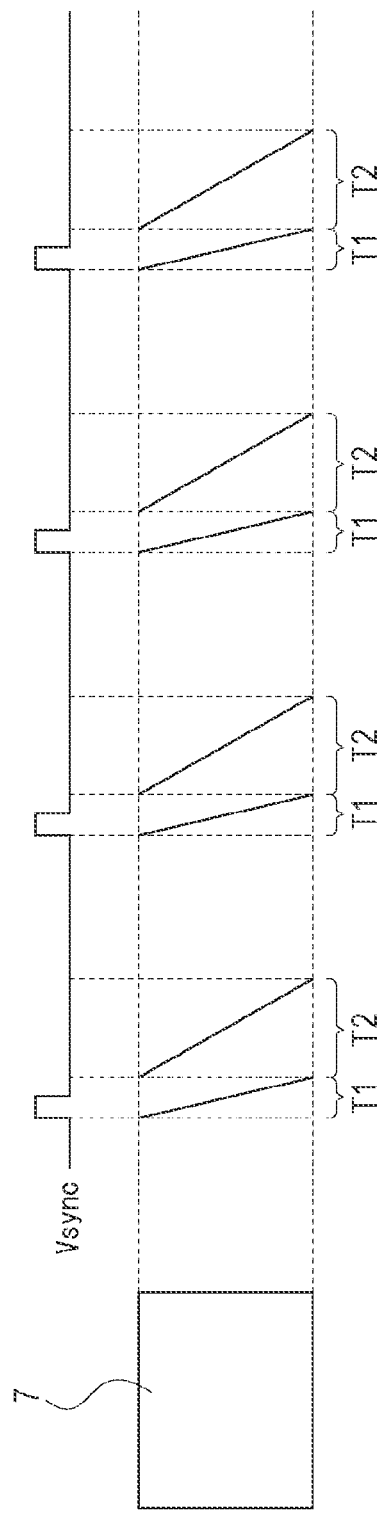
FIG. 24 is a diagram for illustrating a readout time of a signal from each pixel in a case where the phase difference signal output from the light shielding pixel is used.

Since the signal output from the PD division pixel 21B is used for generating a normal image signal, a signal obtained by adding the outputs of the division pixels is read. FIG. 24 illustrates reading timings of signals from the light shielding pixel 21A and the PD division pixel 21B.

As illustrated, in accordance with the vertical synchronization signal Vsync, reading of the first pixel row 22A to which the light shielding pixel 21A from which the phase difference signal SGn is acquired among the light shielding pixels 21A belongs is sequentially performed from the top of the imaging element 7. The readout time required to read out all the phase difference signals SGn output from the imaging element 7 is set as time T1.

The signals output from the PD division pixel 21B include a signal SGR output from the second pixel row 22B to which the PD division pixel 21Br and the PD division pixel 21Bg belong, and a signal SGB output from the second pixel row 22B to which the PD division pixel 21Bb and the PD division pixel 21Bg belong. The signal SGR and the signal SGB are read in order from the top of the imaging element 7.

The readout time required to read out all the signal SGR and the signal SGB output from the imaging element 7 is set as time T2.

Since the number of the PD division pixels 21B is larger than that of the light shielding pixels 21A, the time T2 is set to be longer than the time T1.

In a case where the exposure amount is equal to or larger than the threshold value Th, it is possible to realize quick AF control by using the phase difference signal from the light shielding pixel 21A having a short readout time. Furthermore, in the off-axis region ArM, the reliability of the phase difference signal output from the PD division pixel 21B decreases as the pupil distance is farther from the designed distance, but this can be avoided by selecting the phase difference signal output from the light shielding pixel 21A in the off-axis region ArM in a case where the exposure amount is equal to or greater than the threshold value Th.

Furthermore, since the readout time of the signal is shorter in the light shielding pixel 21A, it is possible to shorten the time until focusing by the AF control.

Next, a case where the exposure amount is less than the threshold value Th will be described.

In the on-axis region ArC, the phase difference signal output from the PD division pixel 21B is selected. Reading of charges obtained by photoelectrically converting light received by the light shielding pixel 21A and the PD division pixel 21B will be described with reference to FIGS. 25 and 26.

The output signal from first pixel row 22A in which light shielding pixel 21A is disposed is used to generate a normal image signal. Specifically, only output signals from each of the division pixels as the PD division pixels 21Bg disposed between the light shielding pixels 21A are read out.

Figure 25:
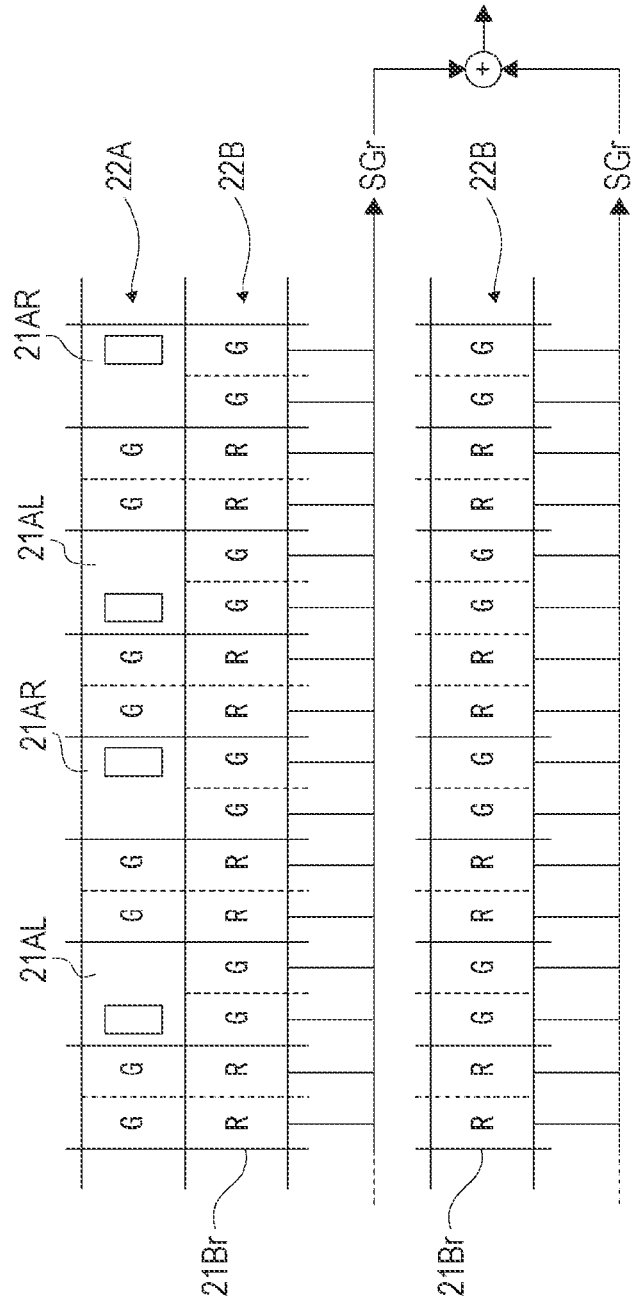
FIG. 25 is a diagram for illustrating a method of reading a signal from each pixel in a case where the phase difference signal output from the PD division pixel is used.

Since the output signal from second pixel row 22B in which PD division pixel 21B is disposed is used as the phase difference signal, the output of each division pixel is read out (see FIG. 25). Furthermore, since the exposure amount is less than the threshold value Th, in order to improve the S/N ratio, the required number of outputs of the adjacent second pixel rows 22B are added to improve the S/N ratio of the phase difference signal. In FIG. 25, two second pixel rows 22B are added, but three or more second pixel rows 22B are added in a case where the exposure amount further decreases. Therefore, deterioration of the S/N ratio can be suppressed with respect to a decrease in the exposure amount, and appropriate AF control can be performed.

Note that the phase difference signal from second pixel row 22B includes phase difference signal SGr output from second pixel row 22B including PD division pixel 21Br and phase difference signal SGb output from second pixel row 22B including PD division pixel 21Bb. In the addition of the phase difference signals, the phase difference signals SGr are added and the phase difference signals SGb are added.

Figure 26:
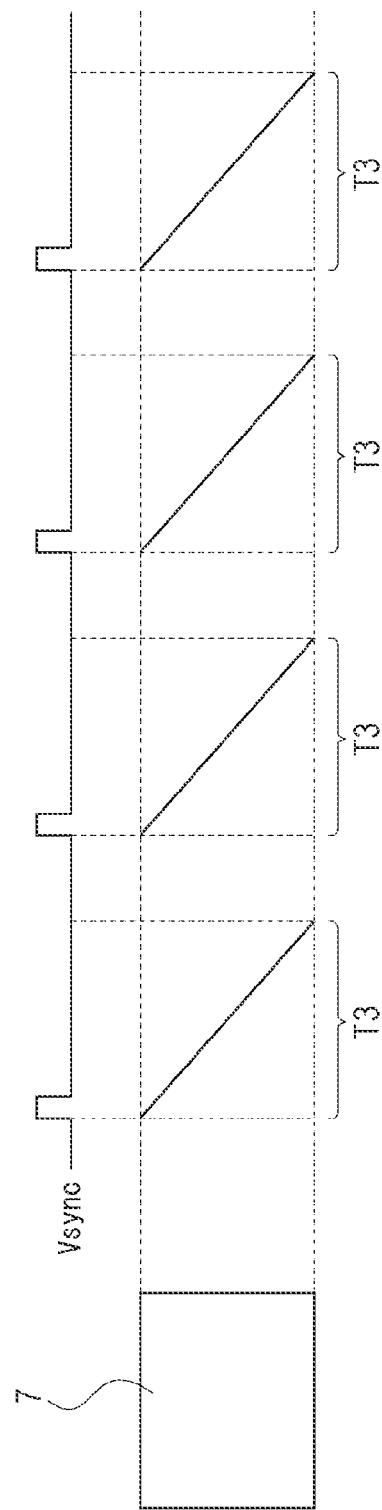
FIG. 26 is a diagram for illustrating a readout time of a signal from each pixel in a case where the phase difference signal output from the PD division pixel is used.

FIG. 26 illustrates reading timings of signals from the PD division pixel 21B. Note that the signal from the light shielding pixel 21A is not used for AF control or image signal generation, and thus is not read.

The phase difference signals SGr and SGb output from the PD division pixel 21B are read out in order from the top of the imaging element 7.

Figure 23:
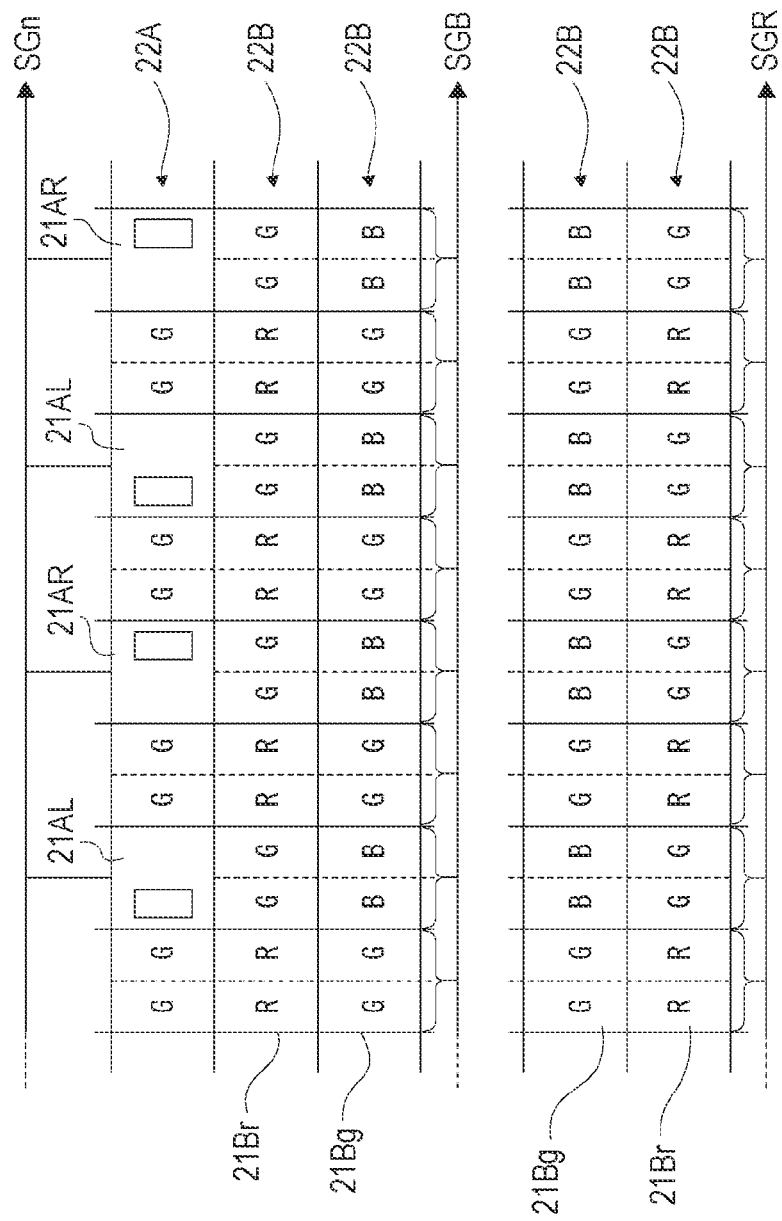
FIG. 23 is a diagram for illustrating a method of reading a signal from each pixel in a case where the phase difference signal output from the light shielding pixel is used.

The readout time required to read out all the phase difference signals SGr and SGb output from the imaging element 7 is set as time T3. The time T3 is substantially twice the time T2 in FIG. 24. As illustrated in FIGS. 23 and 25, this is on the basis of a difference whether reading is performed in units of pixels or in units of division pixels.

Next, the phase difference signal in a case where the exposure amount is less than the threshold value Th and is in the off-axis region ArM will be described. In this case, as illustrated in FIG. 22, the phase difference signal output from the light shielding pixel 21A is selected.

In this case, as illustrated in FIGS. 23 and 24, the phase difference signal SGn output from the first pixel row 22A is read at the time T1, and the signals SGR and SGB for generating a normal image signal output from the second pixel row 22B are read out at the time T2.

However, in a case where the optical system 16 includes the ideal pupil distance set for the PD division pixel 21B, the phase difference signal output from the PD division pixel 21B can be selected even in the AF control of the off-axis region ArM. In this case, as illustrated in FIGS. 25 and 26, the phase difference signal SGn output from the light shielding pixel 21A of the first pixel row 22A is not read, but the outputs from the PD division pixels 21B disposed in the first pixel row 22A and the second pixel row 22B are read at time T3.

Note that, in the off-axis region ArM in a case where the optical system 16 includes the ideal pupil distance set for the PD division pixel 21B, it may not be clear which of the phase difference signal output from the light shielding pixel 21A and the phase difference signal output from the PD division pixel 21B has high reliability. In that case, both the phase difference signal of the light shielding pixel 21A and the phase difference signal of the PD division pixel 21B are acquired, and AF control may be performed using both.

Figure 27:
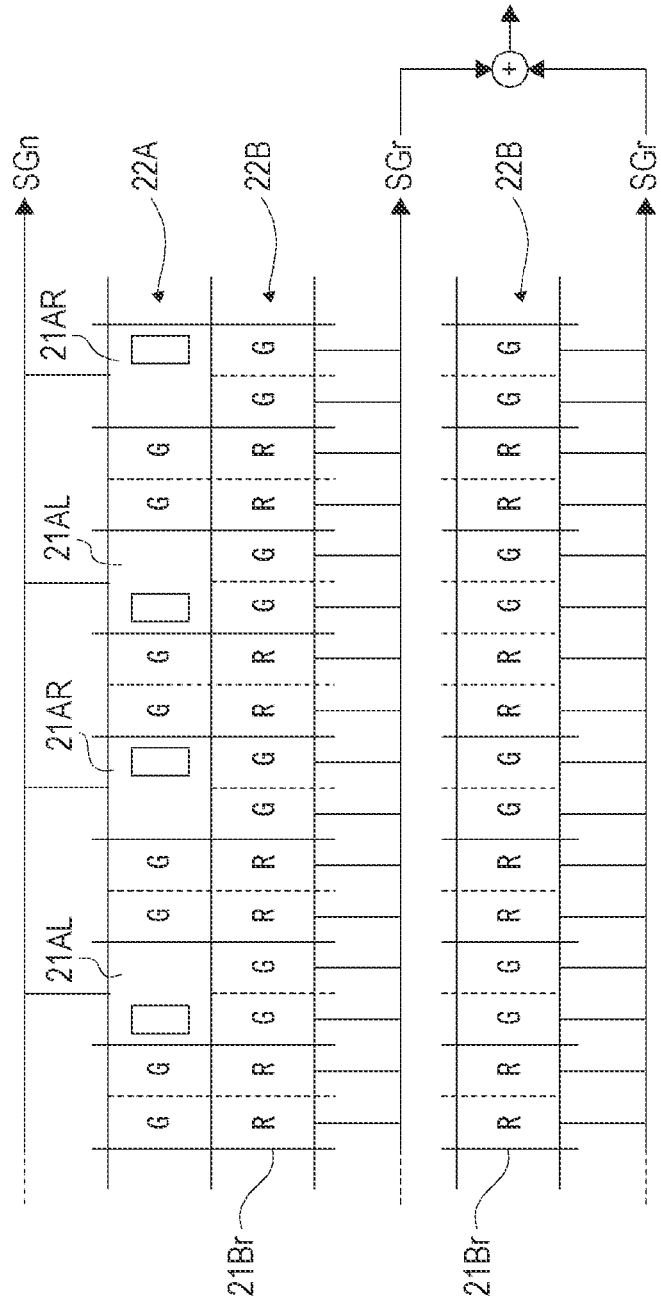
FIG. 27 is a diagram for illustrating a method of reading a signal from each pixel in a case where the phase difference signal output from the light shielding pixel and the phase difference signal output from the PD division pixel are used.
Figure 28:
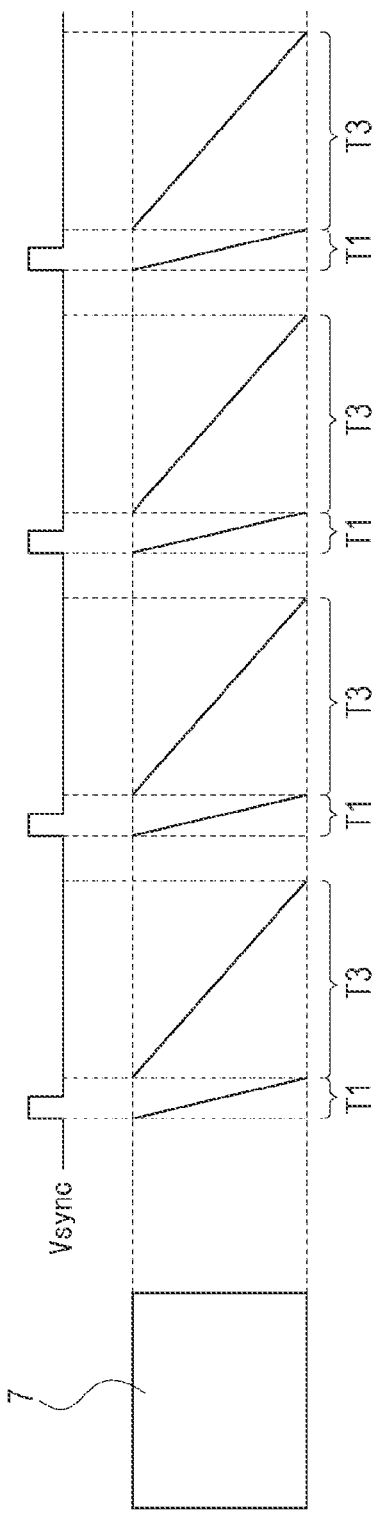
FIG. 28 is a diagram for illustrating the readout time of the signal from each pixel in a case where the phase difference signal output from the light shielding pixel and the phase difference signal output from the PD division pixel are used.

FIGS. 27 and 28 illustrate a case where both the phase difference signal from the light shielding pixel 21A and the phase difference signal from the PD division pixel 21B are acquired.

As illustrated in FIG. 27, the phase difference signal SGn output from the first pixel row 22A in which the light shielding pixels 21A are disposed and the phase difference signals SGr and SGb output from the second pixel row 22B in which the PD division pixels 21B are disposed are read out.

The readout time of the phase difference signal SGn is set as the time T1, and the readout time of the phase difference signal SGr and the phase difference signal SGb is set as the time T3. The total readout time obtained by adding the time T1 and the time T3 is shorter than one cycle of the vertical synchronization signal Vsync.

Note that, in FIG. 22, it has been described that the phase difference signal output from the light shielding pixel 21A is used in the off-axis region ArM in which the exposure amount is less than the threshold value Th. However, there is a case where sufficient AF control cannot be performed even if the phase difference signal output from the light shielding pixel 21A is used. For example, there is a case where the exposure amount is significantly lower than the threshold value Th, and the pupil distance of the exit pupil is significantly different from the design of the PD division pixel 21B.

In such a case, the AF control by the above-described contrast method may be performed. Therefore, the appropriate AF control can be performed under a wide range of conditions.

8. Control of Exposure Amount

Figure 29:
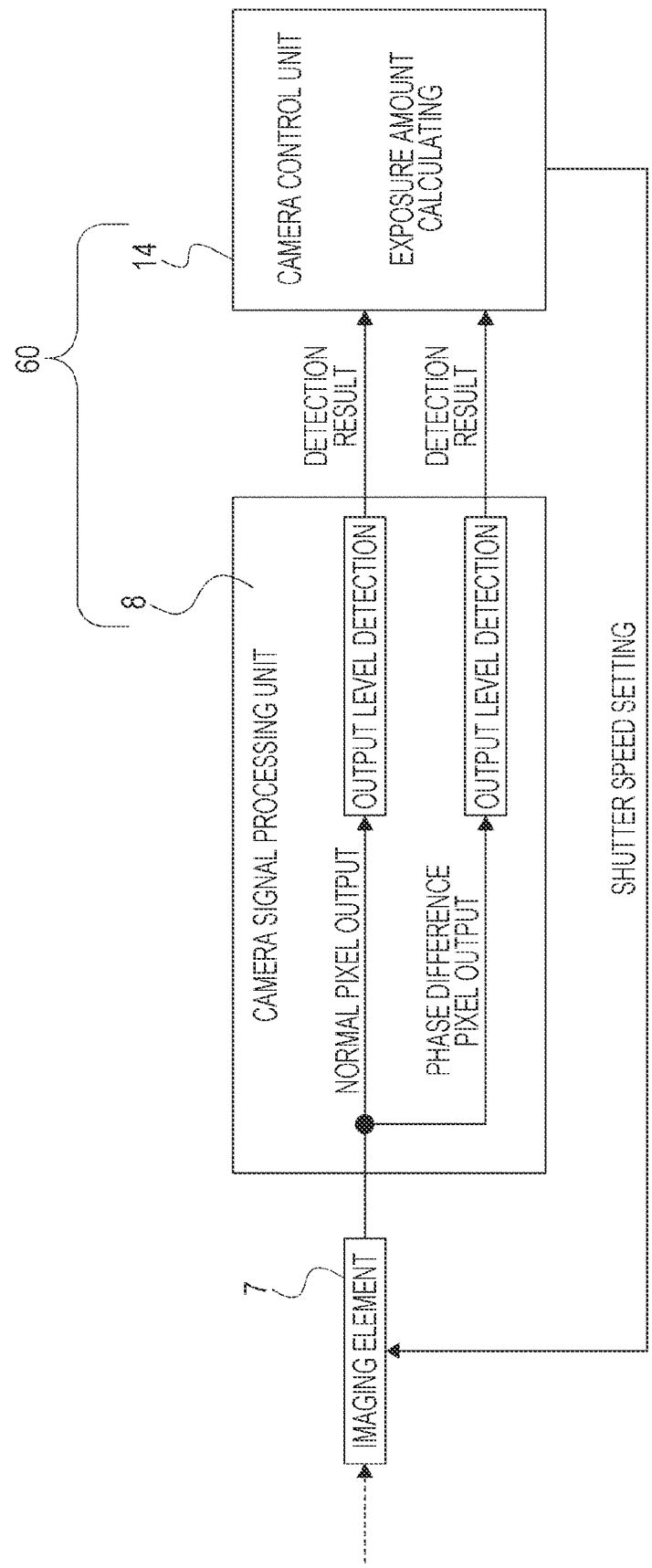
FIG. 29 is a block diagram related to calculation of the exposure amount.

Although it has been described that the phase difference signal is selected on the basis of the exposure amount, here, calculation of the exposure amount will be described with reference to FIG. 29.

The imaging element 7 outputs a normal pixel output for generating a normal image signal and a phase difference pixel output as a phase difference signal for AF control.

The normal pixel output and the phase difference pixel output are input to an output level detection circuit included in the camera signal processing unit 8. The output level detection circuit calculates an output average value in the exposure calculation target region on the pixel on the basis of the input normal pixel output and phase difference pixel output, and each output average value is output from the camera signal processing unit 8 and input to the camera control unit 14.

Note that the exposure calculation target region is a region determined according to the photometry mode and is a region to be subjected to exposure calculation in the image. For example, in a case where the "center-weighted photometry mode" is selected, a central portion of the image is subjected to exposure calculation. Furthermore, in a case where the "spot photometry mode" is selected, a specified narrow region is set as a target of exposure calculation. Furthermore, in a case where the "entire screen average photometry mode" is selected, a region of the entire image is subjected to exposure calculation.

The camera control unit 14 calculates an exposure amount according to the detection result output from the camera signal processing unit 8, and determines a shutter speed (or a parameter capable of adjusting an exposure amount such as an F value or a gain). The camera control unit 14 performs processing of setting the determined shutter speed in the imaging element 7.

The shutter speed is set, for example, by setting the traveling timing of the electron back film.

The exposure amount calculation performed by the camera control unit 14 may be performed on the basis of only the normal pixel output or may be performed on the basis of only the phase difference pixel output.

Furthermore, the exposure control may be performed on the basis of both the normal pixel output and the phase difference pixel output. In this case, the exposure control of the phase difference pixel is performed on the basis of the phase difference pixel output, and the exposure control of the normal pixel is performed on the basis of the normal pixel output.

9. Processing Flow

9-1. First Example

Figure 30:
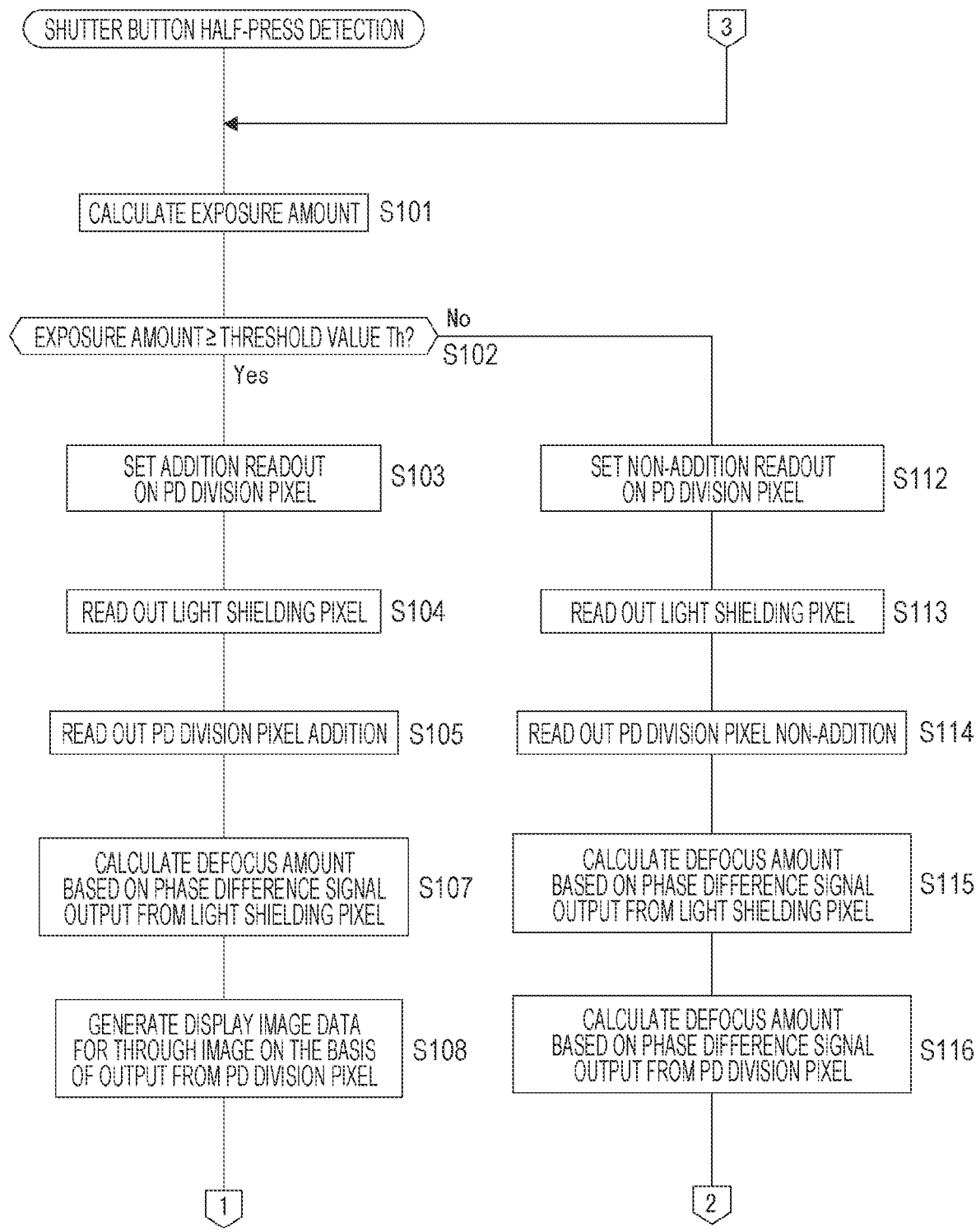
FIG. 30 is a flowchart executed at the time of shutter button half-press detection.
Figure 31:
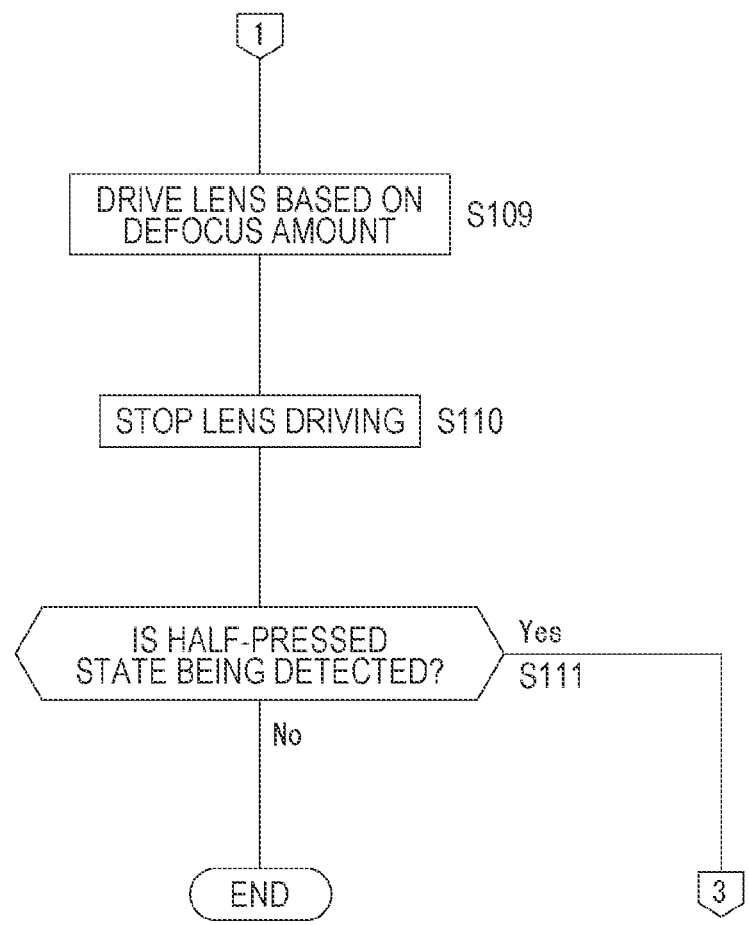
FIG. 31 is a flowchart executed at the time of the shutter button half-press detection.
Figure 32:
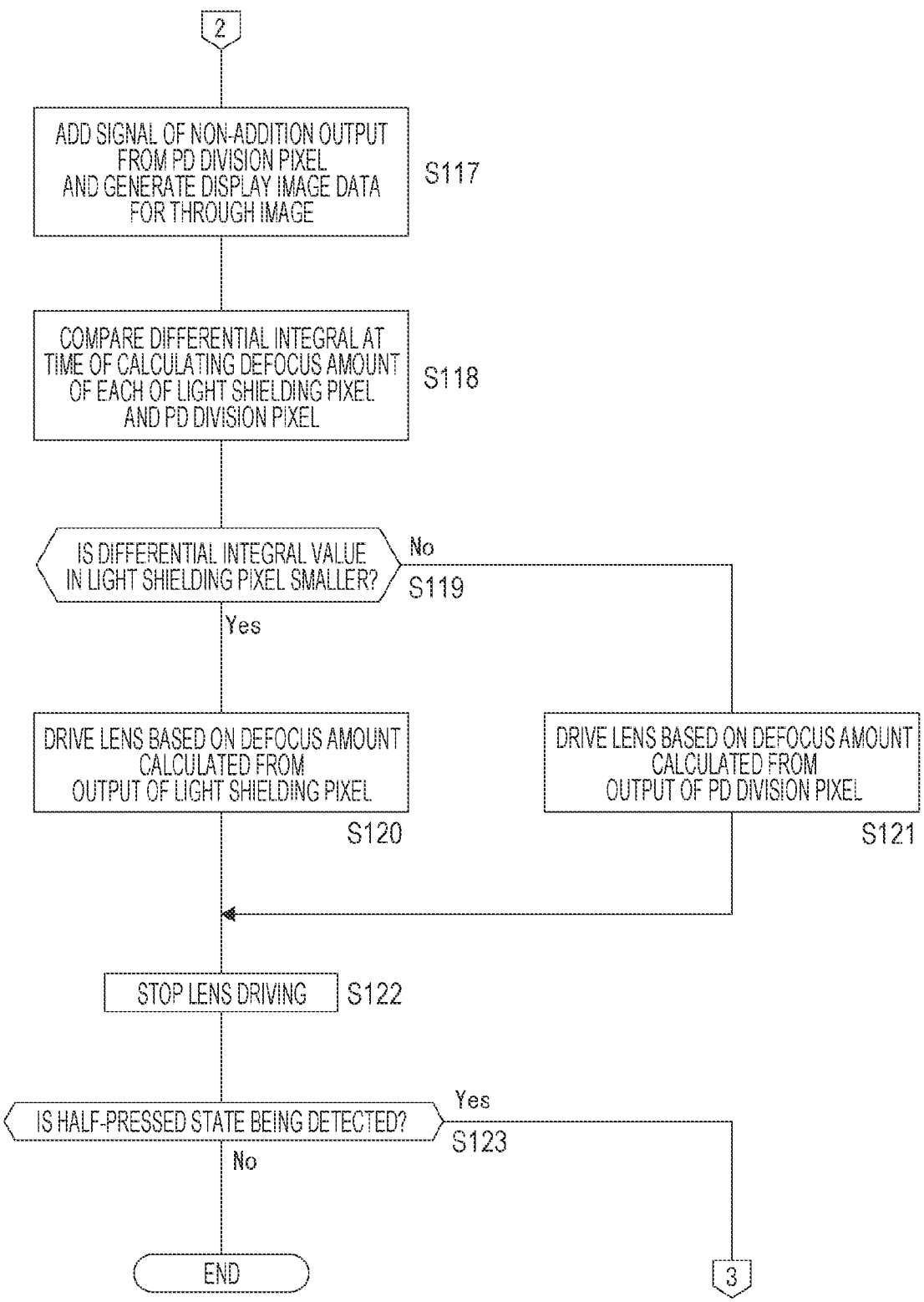
FIG. 32 is a flowchart executed at the time of the shutter button half-press detection.

A first example of the processing flow of the AF control is illustrated in FIGS. 30, 31, and 32.

Note that each processing illustrated in FIGS. 30, 31, and 32 is processing executed by the camera control unit 14 and the camera signal processing unit 8 of the imaging apparatus 1. Here, the camera control unit 14 and the camera signal processing unit 8 are collectively referred to as a "processing unit 60".

When the half-pressed state of the shutter button 6S which is one of the operators 6 is detected, the processing unit 60 (the camera control unit 14 or the camera signal processing unit 8) of the imaging apparatus 1 performs the exposure amount calculation in step S101. In the exposure amount calculation, as described with reference to FIG. 29, the detection processing is performed on the output level of one or both of the normal pixel output and the phase difference pixel output, and the exposure amount is calculated on the basis of the detection result.

In step S102, the processing unit 60 determines whether or not the exposure amount is equal to or greater than the threshold value Th.

In a case where the exposure amount is equal to or larger than the threshold value Th, the processing unit 60 performs the addition readout setting on the PD division pixel 21B in step S103. The addition readout setting is a setting for adding and reading out charges accumulated in the left PD 40L and the right PD 40R included in the PD division pixel 21B at one time. That is, the PD division pixel 21B is treated as one pixel.

Next, the processing unit 60 reads out the light shielding pixels 21A in step 3104, and performs addition reading of the PD division pixels 21B in step 3105. Therefore, the phase difference signal read from the light shielding pixel 21A and the normal pixel signal read from the PD division pixel 21B are read out.

In step S107, the processing unit 60 calculates the defocus amount on the basis of the phase difference signal output from the light shielding pixel 21A. At this time, the processing unit 60 calculates the defocus amount using the output from the first pixel rows 22A0 to 22A7 including the appropriate light shielding pixel 21A according to the pupil distance of the exit pupil EP. Note that, for example, when the lens barrel 3 is attached to the imaging apparatus 1, the camera control unit 14 acquires the pupil distance of the exit pupil EP from the lens barrel control unit 18 and stores the pupil distance in the memory unit 15.

In step S108, the processing unit 60 generates display image data for the through image on the basis of the pixel signal from the PD division pixel 21B. The display image data generated here is displayed as the through image on the EVF monitor 5a, the rear monitor 4, or the like.

The processing unit 60 performs lens driving based on the defocus amount in step S109 of FIG. 31, and stops the lens driving in step S110. As a result, the focus lens disposed inside the lens barrel 3 is driven via the driver unit 17 and is focused.

In step S111, the processing unit 60 determines whether or not the half-pressed state of the shutter button 6S is being detected. In a case where the half-pressed state of the shutter button 6S continues, the processing unit 60 returns to the processing of step S101 in FIG. 30 and performs focusing control according to the exposure amount.

Therefore, the in-focus state is continuously maintained as long as the half-pressed state of the shutter button 6S continues.

In a case where it is determined in step S102 that the exposure amount is less than the threshold value Th, the processing unit 60 performs non-addition readout setting on the PD division pixel 21B in step S112. The non-addition readout setting is a setting for reading out so that the charges accumulated in each of the left PD 40L and the right PD 40R included in the PD division pixel 21B at one time can be distinguished. That is, each division pixel is handled independently.

The processing unit 60 reads out the light shielding pixels 21A in step S113, and performs non-addition readout of the PD division pixels in step S114.

In step S115, the processing unit 60 calculates the defocus amount based on the phase difference signal output from the light shielding pixel 21A. Furthermore, in step S116, the processing unit 60 calculates the defocus amount based on the phase difference signal output from the PD division pixel 21B.

By executing each processing from step S113 to step S116, it is possible to perform the focusing control based on the phase difference signal of each of the light shielding pixel 21A and the PD division pixel 21B.

In step S117 of FIG. 32, the processing unit 60 performs addition processing to combine the non-addition signals output from the division pixels of the PD division pixel 21B every PD division pixel 21B, and performs processing for generating display image data for the through image.

In step S118, the processing unit 60 compares the differential integral value at the time of calculating the defocus amount of each of the light shielding pixel 21A and the PD division pixel 21B. The differential integral value represents the magnitude of the phase difference as described with reference to each of FIGS. 8 to 12. In the calculation of the defocus amount, the shift amount of the waveform is determined such that the differential integral value decreases, but it can be considered that the smaller the differential integral value when the final defocus amount is calculated, the higher the reliability of the calculated defocus amount.

Step S118 is a comparison process for determining which one of the defocus amount calculated on the basis of the output of the light shielding pixel 21A and the defocus amount calculated on the basis of the output from the PD division pixel 21B is highly reliable.

In step S119, the processing unit 60 determines whether or not the differential integral value in the light shielding pixel 21A is smaller. In a case where it is determined that the differential integral value in the light shielding pixel 21A is smaller, that is, in a case where it is determined that the defocus amount calculated on the basis of the output of the light shielding pixel 21A has higher reliability, the processing unit 60 performs lens driving based on the defocus amount calculated on the basis of the output of the light shielding pixel 21A in step S120.

On the other hand, in a case where it is determined in step S119 that the differential integral value in the PD division pixel 21B is smaller, that is, in a case where it is determined that the defocus amount calculated on the basis of the output of the PD division pixel 21B has higher reliability, the processing unit 60 performs lens driving based on the defocus amount calculated on the basis of the output of the PD division pixel 21B in step S121.

After executing the processing of step S120 or step S121, the processing unit 60 stops lens driving in step S122.

In step S123, the processing unit 60 determines whether or not the half-pressed state of the shutter button 6S is being detected. In a case where the half-pressed state of the shutter button 6S continues, the processing unit 60 returns to the processing of step S101 in FIG. 30 and performs focusing control according to the exposure amount.

Therefore, the in-focus state is continuously maintained as long as the half-pressed state of the shutter button 6S continues.

Note that, in each processing described in steps S103 to S111 in FIGS. 30 and 31, as illustrated in FIGS. 23 and 24, the light shielding pixel 21A is treated as a pixel that outputs a phase difference signal for focus control, and the PD division pixel 21B is treated as a pixel that outputs a normal pixel signal.

Furthermore, in each processing described in steps S112 to S123 in FIGS. 30 and 31, as illustrated in FIGS. 27 and 28, each pixel of the light shielding pixel 21A and the PD division pixel 21B is treated as a pixel that outputs a phase difference signal, and the PD division pixel 21B is also treated as a pixel that outputs a normal pixel signal.

As illustrated in FIGS. 25 and 26, in a case where the exposure amount is set to be less than the threshold value Th, the PD division pixel 21B is treated as a pixel that outputs a phase difference signal and a pixel that outputs a normal pixel signal without using the light shielding pixel 21A, it can be realized by not executing the processing of steps S113 and S115 in FIG. 30 and the processing of steps S118, S119, and S120 in FIG. 32.

9-2. Second Example

A second example of the processing flow of the AF control will be described with reference to FIGS. 30, 31, and 33. Note that processing similar to those in the first example are denoted by the same reference numerals, and description thereof will be omitted as appropriate.

When the half-pressed state of the shutter button 6S is detected, the processing unit 60 (the camera control unit 14 or the camera signal processing unit 8) of the imaging apparatus 1 performs the exposure amount calculation in step S101 in FIG. 30.

Next, in step S102, the processing unit 60 determines whether or not the exposure amount is equal to or greater than the threshold value Th.

In a case where the exposure amount is equal to or larger than the threshold value Th, the AF control is performed using the phase difference signal output from the light shielding pixel 21A. The processing in this case is similar to that in the first example from step S103 in FIG. 30 to step S111 in FIG. 31.

On the other hand, in a case where it is determined that the exposure amount is less than the threshold value Th, the processing unit 60 executes each processing from step S112 to step S116 in FIG. 30, and subsequently executes step S117 in FIG. 33.

Therefore, the phase difference signal from the light shielding pixel 21A and the phase difference signal from the PD division pixel 21B are acquired, and display image data for through image display is generated on the basis of the signal from the PD division pixel 21B.

Figure 33:
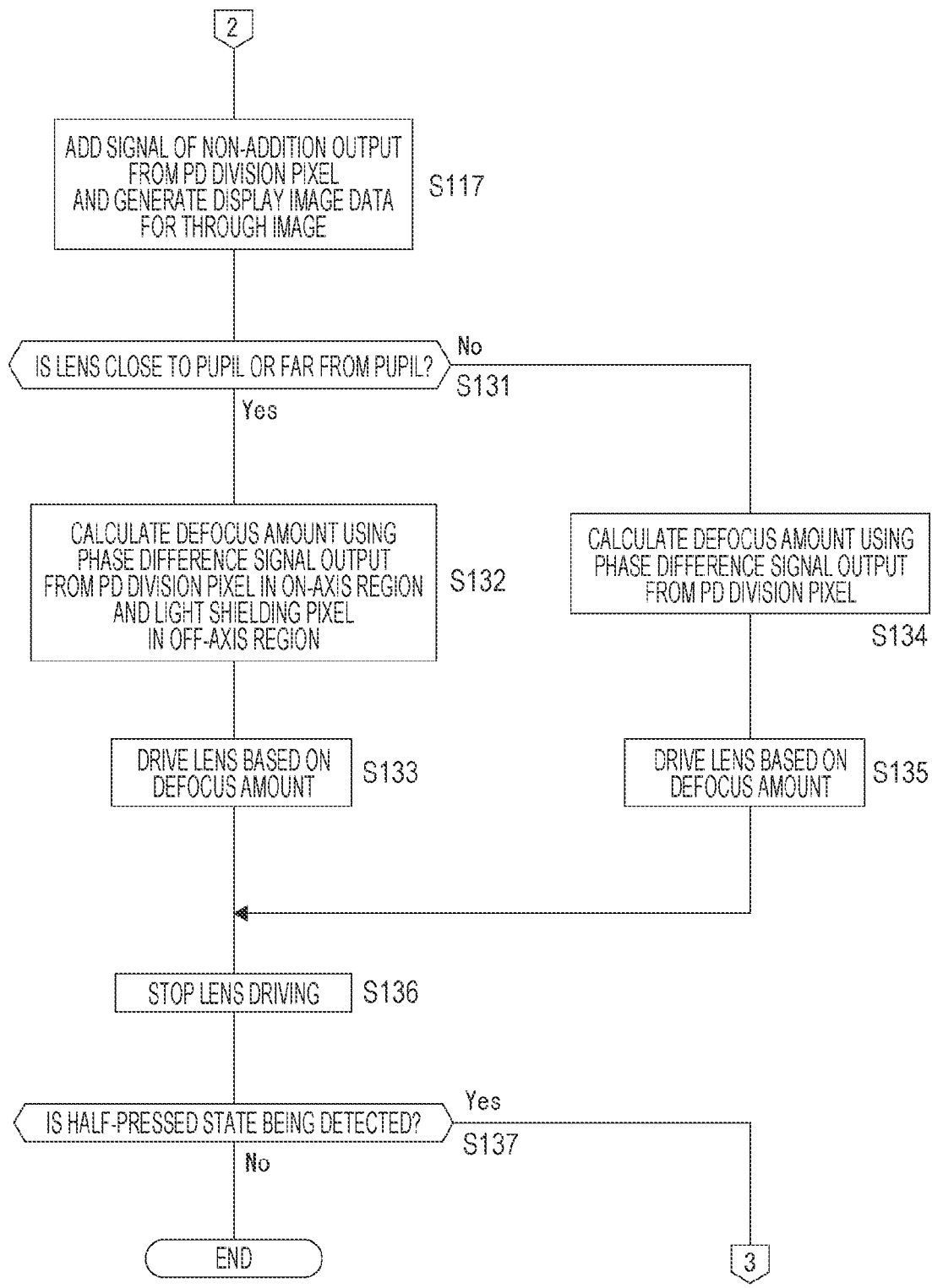
FIG. 33 is a flowchart executed at the time of the shutter button half-press detection.

Next, in step S131 of FIG. 33, the processing unit 60 determines whether or not the deviation between the pupil distance of the exit pupil EP for the PD division pixel 21B to output an appropriate phase difference signal and the pupil distance of the exit pupil EP of the optical system 16 is a predetermined value or more, that is, whether or not the pupil distance of the exit pupil EP of the optical system 16 is closer to, farther from, or coincident with the information of the pupil distance of the exit pupil EP acquired from the lens barrel 3.

As described above, since the incident angle of light on the pixel 21 varies depending on the pupil distance of the exit pupil EP, if the pupil distance deviates from the design, there is a high possibility that a phase difference signal with high reliability cannot be acquired from the PD division pixel 21B.

In a case where it is determined that the deviation is equal to or larger than the predetermined value, that is, in a case where it is determined that the pupil distance of the exit pupil EP is the optical system 16 closer than designed or when it is determined that the pupil distance is the optical system 16 farther than designed, the phase difference signal output from the PD division pixel 21B disposed in the off-axis region ArM has low reliability. Therefore, in step S132, the processing unit 60 calculates the defocus amount using the phase difference signal output from the PD division pixel 21B in the on-axis region ArC and the phase difference signal output from the light shielding pixel 21A in the off-axis region ArM.

Subsequently, the processing unit 60 performs lens driving based on the calculated defocus amount in step S133.

On the other hand, in a case where, in step 3131, it is determined that the deviation of the pupil distance is less than the predetermined value, that is, in a case where it is determined that the pupil distance of the exit pupil EP is the designed optical system 16 or in a case where it is determined that the exit pupil EP is the optical system 16 close to the design, since the reliability of the phase difference signal output from the PD division pixel 21B disposed in the off-axis region ArM is high, the processing unit 60 calculates the defocus amount using the phase difference signal output from the PD division pixel in step S134.

Next, in step S135, the processing unit 60 performs lens driving based on the defocus amount.

After executing the processing of step S133 or step S135, the processing unit 60 stops lens driving in step S136.

In step 3137, the processing unit 60 determines whether or not the half-pressed state of the shutter button 6S is being detected. In a case where the half-pressed state of the shutter button 6S continues, the processing unit 60 returns to the processing of step 3101 in FIG. 30 and performs focusing control according to the exposure amount.

Therefore, the in-focus state is continuously maintained as long as the half-pressed state of the shutter button 6S continues.

Note that, in the above-described example, focusing is performed on both the on-axis region ArC and the off-axis region ArM, that is, the entire surface of the imaging element 7. In addition to the case, there is a case where focusing is performed on a predetermined region. For example, in a case where the on-axis region ArC receives the reflected light from the person to be focused (that is, in a case where the person to be focused is captured in the on-axis region ArC), focusing is only required to be performed on the on-axis region ArC (or, particularly the area in which the person to be focused is captured).

In that case, the defocus amount is calculated using the phase difference signal output from the PD division pixel 21B in the on-axis region ArC in step S132 without executing the determination processing in step S131.

Alternatively, in a case where a person to be focused is shown in the off-axis region ArM, focusing is only required to be performed on the off-axis region ArM. Specifically, in a case where it is determined as "Yes" in step S131, the defocus amount is calculated using the phase difference signal output from the light shielding pixel 21A of the off-axis region ArM (step S132), and in a case where it is determined as "No" in step S131, the defocus amount is calculated using the phase difference signal output from the PD division pixel 21B of the off-axis region ArM (step S134).

Furthermore, there may be a case where a person to be focused may appear across the on-axis region ArC and the off-axis region ArM. In that case, as described above, the defocus amount may be calculated by performing each processing of steps S131 to S135.

Alternatively, in a case where a person or an object to be focused is not determined, for example, in a case where there is no instruction from the user, after the defocus amount is calculated (Steps S132 and S134) for each on-axis region ArC or off-axis region ArM, or for every subject (for each region in which one subject is captured), determination processing for determining a focus target, processing for causing the user to select a focus target or a region of interest (ROI), or the like may be executed before performing lens driving in steps S133 and S135, and lens driving may be performed according to a result of the determination processing or the selection processing.

10. Modification Example

In the example described above, the AF control is performed on the basis of the calculated defocus amount. As another example, it is conceivable to perform notification control or display control to the user based on the defocus amount and to manually perform the focus operation.

For example, the UI control unit 14a of the camera control unit 14 may assist the user's manual focus operation by displaying information regarding focusing on the EVF monitor 5a or the rear monitor 4.

Furthermore, an example in which the above-described light shielding pixel 21A includes one PD has been described, but a plurality of PDs may be included as division pixels. For example, all the pixels of the imaging element 7 may be PD division pixels including two division pixels. That is, each pixel may include the left PD 40L and the right PF 40R. Even with such a configuration, in the light shielding pixel 21A, by adding and reading the outputs from the two division pixels, it can be handled as one PD.

Since all the pixels on the imaging element 7 have the same configuration, the manufacturing of the imaging element 7 can be facilitated. Furthermore, the manufacturing cost can be reduced.

11. Summary

As described in each of the above-described examples, the imaging apparatus 1 according to the present technology includes the imaging element 7 including the light shielding pixel 21A having a pupil division function by including the light shielding portion 31 that shields one of a pair of light fluxes passing through a pair of partial regions (the left pupil region EPL and the right pupil region EPR) biased in opposite directions in a predetermined direction (for example, the left-right direction) in the exit pupil EP and the light receiving element (PD 30) that receives the other light flux; and the photodiode division pixel (PD division pixel 21B) having a pupil division function by including the division pixels (the left PD 40L and the right PD 40R) that respectively receive the pair of light fluxes passing through the pair of partial regions.

The light shielding pixel 21A includes, for example, the light shielding pixel 21AR that is a pixel on which only light that has passed through the left pupil region EPL, which is a left-half region of the exit pupil EP by the light shielding portion 31, is incident, and a light shielding pixel 21AL that is a pixel on which only light that has passed through the right pupil region EPR, which is a right-half region of the exit pupil by the light shielding portion 31, is incident.

Furthermore, the PD division pixel 21B is a so-called PD division pixel in which a plurality of division pixels (the left PD 40L and the right PD 40R) are disposed in a region for one pixel. Each pixel is, for example, a color pixel of a Bayer array, and includes one color filter 33 and a light receiving element (the PD 30, the left PD 40L, and the right PD 40R) that receives incident light passing through the color filter 33.

Furthermore, the defocus amount calculation unit 8a that calculates the defocus amount using at least one of the signal (the phase difference signal SG) output from the light shielding pixel 21A and the signal (the phase difference signals SGr and SGb) output from the PD division pixel 21B on the basis of the exposure amount.

The light shielding pixel 21A and the PD division pixel 21B each output a phase difference signal capable of calculating a defocus amount. Therefore, using an appropriate phase difference signal on the basis of the exposure amount among the phase difference signals output from the light shielding pixel 21A and the PD division pixel 21B, an appropriate defocus amount can be calculated.

Furthermore, each pixel included in the imaging element 7 may be either the light shielding pixel 21A or the PD division pixel 21B.

That is, in the imaging element 7, all the pixels are either the light shielding pixels 21A or the PD division pixels 21B.

Therefore, it is not necessary to complicate the manufacturing of the imaging element 7, and it is possible to shorten the manufacturing time and reduce the manufacturing cost.

As described with reference to FIG. 22 in the selection of the phase difference signal, the defocus amount calculation unit 8a may calculate the defocus amount using the output signal (the phase difference signal SG) of the light shielding pixel 21A in a case where the exposure amount is equal to or greater than the threshold value Th.

Since the light shielding pixel 21A includes the light shielding portion 31, the output signal level is smaller than that of the PD division pixel 21B.

Furthermore, the number of light shielding pixels 21A is smaller than that of the PD division pixels 21B, and the light shielding pixels are discretely disposed. Therefore, in a case where the exposure amount is small, the signal level cannot be increased by adding the signals output from the plurality of pixels, and it is difficult to improve the S/N ratio. Therefore, there is a possibility that the reliability of the calculated defocus amount decreases. However, when the exposure amount is equal to or greater than the threshold value Th, the output level of the phase difference signal from the light shielding pixel 21A is equal to or greater than a certain level, so that the degree of reliability of the defocus amount calculated using the output signal of the light shielding pixel 21A can be increased.

As described with reference to FIG. 22 in the selection of the phase difference signal, in a case where the exposure amount is less than the threshold value Th, the defocus amount calculation unit 8a may calculate the defocus amount using at least one of the output signal of the light shielding pixel 21A and the output signal of the PD division pixel 21B according to the on-axis region ArC that is the region including the central portion of the imaging element 7 or the off-axis region ArM that is the region other than the on-axis region ArC of the imaging element 7.

In a case where the exposure amount is less than the threshold value Th, there are a case where it is preferable to calculate the defocus amount using the output signal of the PD division pixel 21B having high low illuminance performance and a case where it is preferable to calculate the defocus amount using the output signal of the light shielding pixel 21A capable of selecting an appropriate output according to the pupil distance of the exit pupil EP. According to the present configuration, it is possible to select an output signal of a suitable image plane phase difference pixel, thereby calculating a defocus amount with high reliability.

As described with reference to FIG. 22 in the selection of the phase difference signal, the defocus amount calculation unit 8a may calculate the defocus amount using the output signal (the phase difference signals SGr and SGb) of the PD division pixel 21B in the on-axis region ArC.

Since the PD division pixel 21B does not include the light shielding portion 31, the output signal level is made higher than that of the light shielding pixel 21A.

Furthermore, the number of the PD division pixels 21B is larger than that of the light shielding pixels 21A. Therefore, even in a case where the exposure amount is low, the S/N ratio of the phase difference signal can be improved by adding the outputs of the plurality of pixel rows, and the output level of the phase difference signal necessary for calculating the defocus amount can be easily secured. Therefore, it is possible to calculate the in-focus position information and the lens drive amount with high accuracy.

As described with reference to FIG. 22 in the selection of the phase difference signal, the defocus amount calculation unit Sa may calculate the defocus amount using the output signal of the light shielding pixel 21A in the off-axis region ArM.

Therefore, the defocus amount with high reliability is calculated and the focusing accuracy can be improved.

As described with reference to FIG. 22 in the selection of the phase difference signal, the defocus amount calculation unit 8a may calculate the defocus amount using the output signal of the photodiode division pixel (the PD division pixel 21B) in the off-axis region ArM.

Therefore, the defocus amount with high reliability is calculated and the focusing accuracy can be improved.

As described with reference to FIG. 22 in the selection of the phase difference signal, the defocus amount calculation unit 8a may calculate the defocus amount using the output signal with higher reliability out of the output signal of the light shielding pixel 21A and the output signal of the photodiode division pixel (the PD division pixel 21B).

Therefore, the defocus amount with high reliability is calculated and the focusing accuracy can be improved.

Each division pixel (the left PD 40L and the right PD 40R) of the PD division pixel 21B has, for example, the same light receiving area.

In this case, in order for the light passing through the left pupil region EPL of the exit pupil EP to be incident on one division pixel (the right PD 40R) and the light passing through the right pupil region EPR to be incident on the other division pixel (the left PD 40L), the optical system 16 needs to include a specific pupil distance according to the arrangement of the on-chip micro-lens 34 and the like included in the PD division pixel 21B. On the other hand, a plurality of types (the light shielding pixels LS0 to LS7 and the light shielding pixels RS0 to RS7) of the light shielding pixels 21A can be provided according to the pupil distance. Therefore, in the off-axis region ArM of the imaging element 7, the light shielding pixel 21A may have a signal level of the output signal decreased due to the insufficient light reception amount, and the PD division pixel 21B may have a decreased reliability of the output signal due to an inappropriate pupil distance. Therefore, if the defocus amount is always calculated on the basis of any one of the phase difference signals, the reliability may be low.

In the above-described example, in the off-axis region ArM where the exposure amount is less than the threshold value Th, both the output signal of the light shielding pixel 21A and the output signal of the PD division pixel 21B are acquired, and the defocus amount is calculated using the phase difference signal with higher reliability. Therefore, the highly reliable defocus amount can be calculated.

As described with reference to FIG. 22 in the selection of the phase difference signal, in a case where the exposure amount is less than the threshold value Th, the defocus amount calculation unit 8a may perform the autofocus control on the basis of the contrast method in the off-axis region ArM that is an area other than the on-axis region ArC that is an area including the central portion of the imaging element 7.

For the off-axis region ArM in a case where the exposure amount is insufficient, there is a case where both the reliability of the phase difference information based on the output signal (the phase difference signal SG) of the light shielding pixel 21A and the output signal (the phase difference signals SGr and SGb) of the PD division pixel 21B may be low.

In such a case, by adopting the contrast method, appropriate autofocus control can be executed.

As described with reference to FIG. 20 in the configuration of the imaging element 7, the imaging element 7 may include a plurality of types of light shielding pixels 21A (the light shielding pixels LS0 to LS7 and the light shielding pixels RS0 to RS7) according to the pupil distance of the exit pupil EP.

Therefore, even if the pupil position of the exit pupil EP changes as the optical system 16 is driven, an appropriate phase difference signal can be obtained from any of the plurality of types of light shielding pixels 21A.

Therefore, for example, even if the pupil distance of the exit pupil EP fluctuates in a wide range by using the interchangeable lens barrel 3 or the like, the defocus amount with high reliability can be calculated.

As described with reference to FIGS. 17 and 19 in the configuration of the imaging element 7, the plurality of types of light shielding pixels 21A (the light shielding pixels LS0 to LS7 and the light shielding pixels RS0 to RS7) may be different in the light shielding region of the light shielding portion 31.

For example, the smaller the pupil distance, the larger the light shielding region of the light shielding portion 31.

Therefore, in each pixel included in the light shielding pixel 21A, the light shielding portion 31 is formed such that only light passing through one-side region of the exit pupil EP is received according to the pupil distance, and an appropriate output signal (the phase difference signal SG) of the light shielding pixel 21A can be output.

As described with reference to FIG. 30 regarding the first example of the processing flow of the AF control, the defocus amount calculation unit 8a may calculate the defocus amount using the output signal (the phase difference signal SG) of the light shielding pixel 21A selected according to the pupil distance of the exit pupil EP.

Therefore, the light shielding pixel 21A that receives the light passing through the one-side region of the exit pupil EP is selected.

Therefore, it is possible to calculate the defocus amount with high reliability using an appropriate output signal of the light shielding pixel 21A.

As described with reference to FIG. 30 for the first example of the processing flow of the AF control, the camera control unit 14 that acquires the pupil distance from the lens barrel control unit 18 included in the lens barrel 3 may be included.

For example, in the imaging apparatus 1 including the interchangeable lens barrel 3, the light shielding pixel 21 A (a part of the light shielding pixels LS0 to LS7 and the light shielding pixels RS0 to RS7) according to the pupil distance is selected.

As described with reference to FIG. 20 in the configuration of the imaging element 7, the light shielding pixels 21A disposed in the same row (same pixel row) on the imaging element 7 may correspond to the same pupil distance.

Therefore, the output signals of the plurality of types of light shielding pixels 21A are not mixed with the pixel signal read every pixel row.

Therefore, it is easy to process the output signal of the light shielding pixel 21A selected according to the pupil distance, and the processing load can be reduced.

As described with reference to FIGS. 31 and 33 regarding the first example and the second example of the processing flow of the AF control, the camera control unit 14 that gives a drive instruction to the focus lens included in the imaging optical system (the optical system 16) on the basis of the defocus amount may be included.

Therefore, the focus lens is controlled by the phase difference signal based on the exposure amount.

Therefore, appropriate focus control based on the exposure amount can be performed.

As described in the modification example, a user interface control unit (the UI control unit 14a) that performs display control based on the defocus amount may be provided.

Therefore, for example, information for notifying the photographer of the focus state according to the current lens position can be provided.

Therefore, the photographer can perform a focus operation based on the notification information to focus.

For the selection of the phase difference signal, as described with reference to FIG. 23, in a case where the defocus amount is calculated using the output signal (the phase difference signal SG) of the light shielding pixel 21A, the imaging element 7 may add and output the output signal of the PD division pixel 21B (the left PD 40L and the right PD 40R).

Therefore, the number of times of reading can be reduced as compared with the case of separately reading the output from each division pixel.

Therefore, the time required for reading out the pixel signal can be reduced.

As described with reference to FIG. 25 regarding the selection of the phase difference signal, in a case where the defocus amount is calculated using the output signal (the phase difference signals SGr and SGb) of the PD division pixel 21B, the imaging element 7 may output each of the output signals of the PD division pixels 21B (the left PD 40L and the right PD 40R).

Therefore, the output signals of the division pixels are acquired without being added.

Therefore, the output signal of the PD division pixel 21B can be acquired without losing the phase difference information, and the defocus amount can be calculated.

For the selection of the phase difference signal, as described with reference to FIG. 25, the signal processing unit (the camera signal processing unit 8) that performs signal processing on the image signal output from the imaging element 7 may be included, and the signal processing unit may add the output signal of the PD division pixel 21B in the column direction in a case where the exposure amount is less than a predetermined value (for example, in a case where the exposure amount is an exposure amount at which the output level is less than a predetermined value).

Therefore, the output level of the signal (the phase difference signals SGr and SGb) output from the PD division pixel 21B can be maintained at a predetermined level or higher.

Therefore, the S/N ratio of the output signal of the PD division pixel 21B can be improved, and the reliability of the calculated defocus amount can be improved.

The program according to the embodiment is a program for causing, for example, a CPU, a DSP, or a device including the CPU and the DSP to execute each processing illustrated in FIGS. 30 to 33.

That is, the program of the embodiment is a program for causing an imaging apparatus or the like to execute processing of selecting a phase difference signal of one of an output signal of a light shielding pixel and an output signal of a PD division pixel on the basis of an exposure amount and calculating a defocus amount, the output signal of the light shielding pixel having a pupil division function by including a light shielding portion that shields one of a pair of light fluxes having passed through a pair of partial regions deviated in opposite directions in a predetermined direction in an exit pupil and a light receiving element that receives the other light flux, the output signal of the PD division pixel having a pupil division function by including a division pixel that receives each of the pair of light fluxes having passed through the pair of partial regions.

With such a program, the above-described imaging apparatus 1 can be realized.

A program for realizing such an imaging apparatus 1 can be recorded in advance in an HDD as a recording medium built into equipment such as the imaging apparatus 1, a ROM in a microcomputer having a CPU, or the like.

Alternatively, the program can be temporarily or permanently stored (recorded) in a removable recording medium such as a flexible disk, a compact disc read only memory (CD-ROM), a magneto-optical (MO) disk, a digital versatile disc (DVD), a Blu-ray disc (registered trademark), a magnetic disk, a semiconductor memory, or a memory card. Such a removable recording medium can be provided as so-called package software.

Furthermore, such a program can be installed from a removable recording medium to a personal computer or the like, or can be downloaded from a download site via a network such as a local area network (LAN) or the Internet.

Furthermore, such a program is suitable for providing the imaging apparatus 1 of the embodiment in a wide range. For example, by downloading the program to a mobile terminal device such as a smartphone or a tablet having a camera function, a mobile phone, a personal computer, a game device, a video device, a personal digital assistant (PDA), or the like, these devices can be caused to function as the imaging apparatus 1 of the present disclosure.

Note that the effects described in the present specification are merely examples and are not limited, and other effects may be provided.

12. Present Technology

The present technology can also adopt the following configurations.

(1)
An imaging apparatus including:
an imaging element including a light shielding pixel and a photodiode division pixel; and
a defocus amount calculation unit that calculates a defocus amount using at least one of an output signal of the light shielding pixel and an output signal of the photodiode division pixel on the basis of an exposure amount.

(2)
The imaging apparatus according to above (1),
in which the light shielding pixel has a pupil division function by including a light shielding portion that shields one of a pair of light fluxes having passed through a pair of partial regions deviated in opposite directions in a predetermined direction in an exit pupil and a light receiving element that receives the other light flux.

(3)
The imaging apparatus according to above (2),
in which the photodiode division pixel has a pupil division function by including a division pixel that receives each of a pair of light fluxes having passed through the pair of partial regions.

(4)
The imaging apparatus according to any one of above (1) to above (3),
in which each pixel included in the imaging element is one of the light shielding pixel and the photodiode division pixel.

(5)
The imaging apparatus according to any one of above (1) to (4),
in which the defocus amount calculation unit calculates the defocus amount using an output signal of the light shielding pixel in a case where the exposure amount is equal to or greater than a threshold value.

(6)
The imaging apparatus according to any one of above (1) to (5),
in which in a case where the exposure amount is less than a threshold value, the defocus amount calculation unit calculates the defocus amount by using at least one of an output signal of the light shielding pixel and an output signal of the photodiode division pixel according to an on-axis region that is a region including a central portion of the imaging element or an off-axis region that is a region other than the on-axis region of the imaging element.

(7)
The imaging apparatus according to above (6),
in which the defocus amount calculation unit calculates the defocus amount using an output signal of the photodiode division pixel in the on-axis region.

(8)
The imaging apparatus according to any one of above (6) and above (7),
in which the defocus amount calculation unit calculates the defocus amount using an output signal of the light shielding pixel in the off-axis region.

(9)
The imaging apparatus according to any one of above (6) and (7),
in which the defocus amount calculation unit calculates the defocus amount using an output signal of the photodiode division pixel in the off-axis region.

(10)
The imaging apparatus according to any one of above (1) to above (9),
in which the defocus amount calculation unit calculates the defocus amount using an output signal with higher reliability among an output signal of the light shielding pixel and an output signal of the photodiode division pixel.

(11)
The imaging apparatus according to any one of above (1) to above (10),
in which in a case where the exposure amount is less than a threshold value, the defocus amount calculation unit performs autofocus control on the basis of a contrast method in an off-axis region that is a region other than an on-axis region that is a region including a central portion of the imaging element.

(12)
The imaging apparatus according to above (2),
in which the imaging element includes a plurality of types of the light shielding pixels according to a pupil distance of the exit pupil.

(13)
The imaging apparatus according to above (12),
in which the plurality of types of light shielding pixels have different light shielding regions of the light shielding portion.

(14)
The imaging apparatus according to any one of above (12) and above (13),
in which the defocus amount calculation unit calculates the defocus amount using an output signal of the light shielding pixel selected according to the pupil distance of the exit pupil.

(15)
The imaging apparatus according to any one of above (12) to above (14), further including
a camera control unit that acquires the pupil distance from a barrel control unit included in a lens barrel.

(16)
The imaging apparatus according to any one of above (12) to above (15),
in which the light shielding pixels disposed in the same row on the imaging element correspond to the same pupil distance.

(17)
The imaging apparatus according to any one of above (1) to above (16), further including
a camera control unit that performs a driving instruction of a focus lens included in an imaging optical system on the basis of the defocus amount.

(18)
The imaging apparatus according to any one of above (1) to above (17), further including
a user interface control unit that performs display control based on the defocus amount.

(19)
The imaging apparatus according to any one of above (1) to above (18),
in which in a case where the defocus amount is calculated using the output signals of the light shielding pixels, the imaging element adds and outputs the output signals of the photodiode division pixels.

(20)
The imaging apparatus according to any one of above (1) to above (19), in which in a case where the defocus amount is calculated using the output signals of the photodiode division pixels, the imaging element outputs each of the output signals of the photodiode division pixels.

(21)

The imaging apparatus according to any one of above (1) to above (20), further including a signal processing unit that performs signal processing on an image signal output from the imaging element, in which the signal processing unit adds the output signals of the photodiode division pixels in a column direction in a case where the exposure amount is less than a predetermined amount.

(22)

A defocus amount calculation method including selecting a phase difference signal of at least one of an output signal of a light shielding pixel and an output signal of a photodiode division pixel on the basis of an exposure amount and calculating a defocus amount.

REFERENCE SIGNS LIST

1 Imaging apparatus
3 Lens barrel
7 Imaging element
7a Image plane phase difference pixel
8 Camera signal processing unit
8a Defocus amount calculation unit
10 Display unit
14 Camera control unit
14a UI control unit
15 Memory unit
16 Optical system
18 Barrel control unit
21 Pixel
21A Light shielding pixel
21B PD division pixel
30 PD
31 Light shielding portion
40L Left PD
40R Right PD
EP Exit pupil
EPL Left pupil region
EPR Right pupil region
RS0, RS1, RS2, RS3, RS4, RS5, RS6, RS7 Light shielding pixel
LS0, LS1, LS2, LS3, LS4, LS5, LS6, LS7 Light shielding pixel
SG, SG0, SG1, SG2, SG3, SG4, SG5, SG6, SG7 Phase difference signal
SGr, SGb Phase difference signal
S0, S1, S2, S3, S4, S5, S6, S7 Pupil distance
Th Threshold value

The invention claimed is:

1. An imaging apparatus comprising:
  an imaging element including a light shielding pixel and a photodiode division pixel; and
  a defocus amount calculation unit that calculates a defocus amount using at least one of an output signal of the light shielding pixel or an output signal of the photodiode division pixel on a basis of an exposure amount, wherein
  the light shielding pixel is configured for a pupil division function by including a light shielding portion that shields a first light flux having passed through a pair of partial regions deviated in opposite directions in a predetermined direction in an exit pupil,
  the imaging element includes a plurality of types of light shielding pixels according to a pupil distance of the exit pupil, and
  light shielding pixels disposed in a same row of the imaging element correspond to a same pupil distance.

2. The imaging apparatus according to claim 1, wherein the photodiode division pixel is configured for a pupil division function by including a division pixel that receives each of a pair of light fluxes having passed through a pair of partial regions.

3. The imaging apparatus according to claim 1, wherein each pixel included in the imaging element is one of the light shielding pixel and the photodiode division pixel.

4. The imaging apparatus according to claim 1, wherein the defocus amount calculation unit calculates the defocus amount using the output signal of the light shielding pixel in a case where the exposure amount is equal to or greater than a threshold value.

5. The imaging apparatus according to claim 1, wherein in a case where the exposure amount is less than a threshold value, the defocus amount calculation unit calculates the defocus amount according to an on-axis region that is a region including a central portion of the imaging element or an off-axis region that is a region other than the on-axis region of the imaging element.

6. The imaging apparatus according to claim 5, wherein the defocus amount calculation unit calculates the defocus amount using the output signal of the photodiode division pixel in the on-axis region.

7. The imaging apparatus according to claim 5, wherein the defocus amount calculation unit calculates the defocus amount using the output signal of the light shielding pixel in the off-axis region.

8. The imaging apparatus according to claim 5, wherein the defocus amount calculation unit calculates the defocus amount using the output signal of the photodiode division pixel in the off-axis region.

9. The imaging apparatus according to claim 1, wherein the defocus amount calculation unit calculates the defocus amount using an output signal with higher reliability among the output signal of the light shielding pixel and the output signal of the photodiode division pixel.

10. The imaging apparatus according to claim 1, wherein in a case where the exposure amount is less than a threshold value, the defocus amount calculation unit performs autofocus control on a basis of a contrast method in an off-axis region that is a region other than an on-axis region that is a region including a central portion of the imaging element.

11. The imaging apparatus according to claim 1 wherein the plurality of types of light shielding pixels have different light shielding regions of the light shielding portion.

12. The imaging apparatus according to claim 1, wherein the defocus amount calculation unit calculates the defocus amount using the output signal of the light shielding pixel as selected according to the pupil distance of the exit pupil.

13. The imaging apparatus according to claim 1, further comprising:
  a camera control unit that acquires the pupil distance from a barrel control unit included in a lens barrel.

14. The imaging apparatus according to claim 1, further comprising:
  a camera control unit that performs a driving instruction of a focus lens included in an imaging optical system on a basis of the defocus amount.

15. The imaging apparatus according to claim 1, further comprising:
a user interface control unit that performs display control based on the defocus amount.

16. The imaging apparatus according to claim 1, wherein
in a case where the defocus amount is calculated using the output signal of the light shielding pixel, the imaging element adds and outputs a plurality of output signals of a corresponding plurality of photodiode division pixels.

17. The imaging apparatus according to claim 1, wherein
in a case where the defocus amount is calculated using the output signal of the photodiode division pixel, the imaging element outputs each of a plurality of output signals of a corresponding plurality of photodiode division pixels.

18. An imaging apparatus a comprising:
an imaging element including a light shielding pixel and a photodiode division pixel;
a defocus amount calculation unit that calculates a defocus amount using at least one of an output signal of the light shielding pixel or an output signal of the photodiode division pixel on a basis of an exposure amount; and
a signal processor configured to perform signal processing on an image signal output from the imaging element, wherein
the signal processor adds output signals of photodiode division pixels in a column direction in a case where the exposure amount is less than a predetermined amount.

19. An imaging apparatus comprising:
an imaging element including a light shielding pixel and a photodiode division pixel;
a memory storing program code; and
a processor configured to execute the program code to perform operations comprising:
performing a defocus amount calculation that calculates a defocus amount using at least one of an output signal of the light shielding pixel or an output signal of the photodiode division pixel on a basis of an exposure amount, wherein
the light shielding pixel is configured for a pupil division function by including a light shielding portion that shields a first light flux having passed through a pair of partial regions deviated in opposite directions in a predetermined direction in an exit pupil,
the imaging element includes a plurality of types of light shielding pixels according to a pupil distance of the exit pupil, and
light shielding pixels disposed in a same row of the imaging element correspond to a same pupil distance.

20. The imaging apparatus according to claim 19, wherein
in a case where the exposure amount is less than a threshold value, the defocus amount calculation calculates the defocus amount according to an on-axis region that is a region including a central portion of the imaging element or an off-axis region that is a region other than the on-axis region of the imaging element.

21. The imaging apparatus according to claim 20, wherein the defocus amount calculation calculates the defocus amount using the output signal of the photodiode division pixel in the on-axis region.

22. The imaging apparatus according to claim 20, wherein the defocus amount calculation unit calculates the defocus amount using the output signal of the light shielding pixel in the off-axis region.

23. An imaging apparatus comprising:
an imaging element including a light shielding pixel and a photodiode division pixel;
a memory storing program code; and
a processor configured to execute the program code to perform operations comprising:
performing a defocus amount calculation that calculates a defocus amount using at least one of an output signal of the light shielding pixel or an output signal of the photodiode division pixel on a basis of an exposure amount, and
performing signal processing on an image signal output from the imaging element, wherein the signal processing includes adding output signals of photodiode division pixels in a column direction in a case where the exposure amount is less than a predetermined amount.

* * * * *